(12) United States Patent
Sealey, II et al.

(10) Patent No.: US 7,090,744 B2
(45) Date of Patent: Aug. 15, 2006

(54) PROCESS FOR MAKING COMPOSITION FOR CONVERSION TO LYOCELL FIBER FROM SAWDUST

(75) Inventors: James E. Sealey, II, Federal Way, WA (US); W. Harvey Persinger, Jr., Enumclaw, WA (US); Mengkui Luo, Tacoma, WA (US); Brian Wester, Sumner, WA (US)

(73) Assignee: Weyerhaeuser Company, Federal Way, WA (US)

( * ) Notice: Subject to any disclaimer, the term of this patent is extended or adjusted under 35 U.S.C. 154(b) by 284 days.

(21) Appl. No.: 10/128,973

(22) Filed: Apr. 23, 2002

(65) Prior Publication Data

US 2003/0025251 A1 Feb. 6, 2003

Related U.S. Application Data

(60) Division of application No. 09/842,274, filed on Apr. 24, 2001, now Pat. No. 6,605,350, which is a continuation-in-part of application No. 09/574,538, filed on May 18, 2000, now Pat. No. 6,331,354, which is a continuation-in-part of application No. 09/256,197, filed on Feb. 24, 1999, now Pat. No. 6,210,801, which is a continuation-in-part of application No. 09/185,423, filed on Nov. 3, 1998, now Pat. No. 6,306,334, which is a continuation-in-part of application No. 09/039,737, filed on Mar. 16, 1998, now Pat. No. 6,235,392, which is a continuation-in-part of application No. 08/916,652, filed on Aug. 22, 1997, now abandoned.

(60) Provisional application No. 60/023,909, filed on Aug. 23, 1996, provisional application No. 60/024,462, filed on Aug. 23, 1996.

(51) Int. Cl.
*D21C 3/02* (2006.01)
*D21C 9/00* (2006.01)
*D01C 1/00* (2006.01)

(52) U.S. Cl. .......................... 162/91; 162/90; 162/78; 162/65; 162/67

(58) Field of Classification Search .................. 162/9, 162/90, 79, 65–67, 71, 78, 87–91, 142, 146, 162/150, 157.1, 157.6, 157.7; 264/203, 233, 264/211.15, 211.14, 5, 187; 428/395, 357, 428/364, 375, 393; 8/116.1, 125
See application file for complete search history.

(56) References Cited

U.S. PATENT DOCUMENTS

| | | | |
|---|---|---|---|
| 3,255,071 A | 6/1966 | Kleinert | |
| 3,294,623 A | 12/1966 | Brinkley, Jr. et al. | |
| 3,579,418 A * | 5/1971 | Ostberg et al. ............... | 162/18 |
| 3,586,600 A | 6/1971 | Rich et al. | |
| 3,632,469 A | 1/1972 | Wilder | |
| 3,652,385 A | 3/1972 | Noreus et al. | |
| 3,652,387 A | 3/1972 | Wilder | |
| 3,684,651 A | 8/1972 | Reinhall | |
| 3,785,920 A | 1/1974 | Johansen | |
| 4,295,925 A | 10/1981 | Bentvelzen et al. | |
| 4,295,926 A | 10/1981 | Bentvelzen et al. | |
| 4,295,927 A | 10/1981 | Bentvelzen et al. | |
| 4,298,426 A | 11/1981 | Torregrossa et al. | |
| 4,338,158 A | 7/1982 | Bentvelzen | |
| 4,372,811 A | 2/1983 | Samuelson et al. | |
| 5,725,821 A | 3/1998 | Gannon et al. | |
| 5,985,097 A * | 11/1999 | Samuelsson ................. | 162/49 |
| 6,042,769 A * | 3/2000 | Gannon et al. ............. | 262/203 |
| 6,210,801 B1 * | 4/2001 | Luo et al. ................... | 423/393 |
| 6,605,350 B1 * | 8/2003 | Sealey, II et al. ........... | 428/393 |

FOREIGN PATENT DOCUMENTS

| | | |
|---|---|---|
| CA | 2071185 A1 | 12/1992 |
| EP | 0 157 179 * | 9/1985 |
| EP | 0 785 304 A2 | 7/1997 |
| FR | 2735794 A1 | 12/1996 |
| GB | 1 253 234 | 11/1971 |
| JP | WO 98/22642 | 5/1998 |
| WO | WO 95/35399 | 12/1995 |
| WO | WO 96/12063 | 4/1996 |
| WO | WO 96/25552 | 8/1996 |

| WO | WO 96/27700 | 9/1996 |
| WO | WO 97/23666 | 12/1996 |
| WO | WO 97/15713 | 5/1997 |
| WO | WO 97/30196 | 8/1997 |
| WO | WO 98/02662 | 1/1998 |
| WO | WO 98/51855 | 11/1998 |
| WO | WO 99/16960 | 4/1999 |
| WO | WO 99/47733 | 9/1999 |

OTHER PUBLICATIONS

Adamski, Z., and J. Kitta, "Sawdust Utilization in Beech Pulp Production / Wykorzystanie Trocin w Produkcji Bukowych mas Celulozowych," *Roczniki Akademii Rolniczej w Posnaniu LXII*:3-10, 1975 [in Polish, summary in English].

Bail, C.M., "Sawdust Pulping Continues to Grow; Technology Improves Yield, Strength," *Pulp & Paper*, Feb. 1979, pp. 105-109.

Bianchi, M.L., et al., "Bleaching of Commercial Pulps with $H_2O_2$ Catalyzed by Heteropolyacids," *Bioresource Technology 68*(1):17-21, Apr. 1999.

Bublitz, W.J., and J.L. Hull, "Stored Softwood Sawdust Can Age Rapidly and Affect Kraft Pulping Operations Significantly," in *Proceedings of Forest Biology Wood Chemistry Conference*, TAPPI, Madison, Wisc., Jun. 20-22, 1977, pp. 177-181.

Chang, H.-M., et al., "Delignification of High-Yield Pulps With Oxygen and Alkali," *Technical Association of the Pulp and Paper Industry 57*(5):123-126, May 1974.

Chawla, J.S., and M.M. Gandotra, "Fir Saw Dust as a Source of Cellulosic Raw Material for Pulping," *Indian Pulp and Paper 21*(5):347-351, Nov. 1966.

Coetzee, B., "Continuous Sapoxal Bleaching—Operating, Technical Experience," *Pulp Paper Mag. Can. 75*(6):T223-228, Jun. 1974.

Gagnon, P.F., and M. Parenteau, "Brightness Loss Reduction and ECF Bleaching of Kraft Pulp at Cartons St-Laurent la Tuque," in *Proceedings of 85th Annual Meeting*, PAPTAC, Jan. 28-29, 1999, pp. B349-B354.

Gustavsson, R., and B. Swan, "Evaluation of the Degradation of Cellulose and Delignification during Oxygen Bleaching," *Proceedings of the TAPPI Non-Sulfur Pulping Symposium,*, Madison, WI, 1974, pp. 43-51.

Helber, B.E., et al., "How Do Your Pulping Methods Compare to 125 Kraft Mills in the United States and Canada?" in *Proceedings of the Alkaline Pulping/Secondary Fibers Conference*, TAPPI, Nov. 7-10, 1977, Washington, D.C., pp. 323-328.

Johnston, G.W., "Weyco Mill Gets $300-Million Facelift," *Pulp & Paper Int'l*, Sep. 1977, pp. 57-60.

Krawchuk, D., "Oxygen Delignification: Proving Practical and Effective," *Mill Product News*, Sep./Oct. 1997, pp. 8-11.

Lauer, K., and H. Chao-Wu, "Viscose Grade Pulps From Sawdust of Loblolly Pine and Gum," *TAPPI 43*(11):165A-168A, Nov. 1960.

Levitin, N., and H. Schwartz, "Delignification of Spruce Sawdust With Chlorine Dioxide," *Journal of FPRS*, Dec. 1953, pp. 78-84.

Lovejoy, R.A., and D.R. Butkus, "Sawdust Pulping With the black Clawson Chemi-Pulper," in *Proceedings of the Alkaline Pulping/Secondary Fibers conference*, TAPPI, Washington, D.C., Nov. 7-10, 1977, pp. 401-404.

Parthasarathy, V.R., et al., "Hydrogen Peroxide Reinforced Oxygen Delignification of Southern (Loblolly) Pine Kraft Pulp and Short Sequence Bleaching," *Proceedings of the TAPPI Pulping Conference*, 1989, pp. 539-547.

Procter, A.R., and W.R. Chow, "Simulated Hardwood Market Kraft Pulp From Western Red Cedar Sawdust," *TAPPI 59*(2):119-123, Feb. 1976.

Rodden, G., "Pioneering Work: Elk Falls Continues in Mini-Chip Pulp Production," *Pulp & Paper Canada 98*(10):18-19, 1997.

San Luis, J.M., and E.C. Amino, "Sawdust for Pulp and Paper Manufacture," *FORPRIDECOM Technical Note 155*:1-2, Jul. 1975.

Sorenson, D.R., "A Modern Sawdust Pulping Installation," in *Proceedings of the Alkaline Pulping Conference*, TAPPI, Williamsburg, Va., Oct. 27-29, 1975, pp. 97-104.

Sorenson, D.R., "Potlach Expands Modern Sawdust Pulping System at Lewiston Mill," *Pulp & Paper*, Dec. 1976, pp. 58-61.

Taylor, T.G., "The Production of bleached Kraft Market Pulp From Sawdust," *Pulp & Paper Canda 78*(1):53-57, Jan. 1977.

Wallis, A.F.A., and R.H. Wearne, "Chemical Cellulose From *Eucalyptus Regnans* Wood by Autohydrolysis-Explosion-Extraction," *Carbohydrate Polymers 17*:103-110, 1992.

Weiner, J., and L. Roth, "Sawdust Pulping—An Annotated Bibliography: Special No. 65," *The Institute of Paper Chemistry*, Appleton, Wisc., 1975.

Winstead, T.E., "Rapid Kraft Pulping of Sawdust and Other Small Wood Particles," *Paper Trade Journal*, Oct. 16, 1972, pp. 52-53.

Woodings, C.R., "Regenerated Cellulosics," *Kirk-Othmer Enclopedia of Chemical Technology*, 4th ed., John Wiley & Sons, vol. 10, "Explosives and Propellants to Flame Retardants for Textiles," pp. 696-726.

\* cited by examiner

*Primary Examiner*—Eric Hug
(74) *Attorney, Agent, or Firm*—Christensen O'Connor Johnson Kindness

(57) ABSTRACT

A process for making a composition for conversion to lyocell fiber where the process comprises pulping a raw material in a digester to provide an alkaline pulp, wherein the raw material comprises sawdust in an amount greater than 0 % up to 100 %; and contacting the alkaline pulp comprising cellulose and at least about 7 % hemicellulose under alkaline conditions with an amount of an oxidant sufficient to reduce the average degree of polymerization of the cellulose to within the range of from about 200 to about 1100, without substantially reducing the hemicellulose content of the pulp or substantially increasing the copper number.

17 Claims, 4 Drawing Sheets

PROCESS FOR MAKING COMPOSITION FOR CONVERSION TO LYOCELL FIBER FROM SAWDUST

CROSS-REFERENCES TO RELATED APPLICATIONS

This application is a divisional of application Ser. No. 09/842,274, filed Apr. 24, 2001, now U.S. Pat. No. 6.605.350, which is a continuation-in-part of application Ser. No. 09/574,538, filed May 18, 2000, now U.S. Pat. No. 6,331,354, which is a continuation-in-part of application Ser. No. 09/256,197, filed Feb. 24, 1999, now U.S. Pat. No. 6,210,801, which is a continuation-in-part of application Ser. No. 09/185,423, filed Nov. 3, 1998, now U.S. Pat. No. 6,306,334, which is a continuation-in-part of application Ser. No. 09/039,737, filed Mar. 16, 1998, now U.S. Pat. No. 6,235,392, which is a continuation-in-part of application Ser. No. 08/916,652, filed Aug. 22, 1997, now abandoned, which claims priority from Provisional Application Ser. Nos. 60/023,909 and 60/024,462, both filed Aug. 23, 1996.

FIELD OF THE INVENTION

The present invention is directed to a composition useful for making lyocell fibers, where the composition is made from a sawdust pulp.

BACKGROUND OF THE INVENTION

Cellulose is a polymer of D-glucose and is a structural component of plant cell walls. Cellulose is especially abundant in tree trunks from which it is extracted, converted into pulp, and thereafter utilized to manufacture a variety of products. Rayon is the name given to a fibrous form of regenerated cellulose that is extensively used in the textile industry to manufacture articles of clothing. For over a century strong fibers of rayon have been produced by the viscose and cuprammonium processes. The latter process was first patented in 1890 and the viscose process two years later. In the viscose process cellulose is first steeped in a mercerizing strength caustic soda solution to form an alkali cellulose. This is reacted with carbon disulfide to form cellulose xanthate which is then dissolved in dilute caustic soda solution. After filtration and deaeration the xanthate solution is extruded from submerged spinnerets into a regenerating bath of sulfuric acid, sodium sulfate, zinc sulfate, and glucose to form continuous filaments. The resulting so-called viscose rayon is presently used in textiles and was formerly widely used for reinforcing rubber articles such as tires and drive belts.

Cellulose is also soluble in a solution of ammonia copper oxide. This property forms the basis for production of cuprammonium rayon. The cellulose solution is forced through submerged spinnerets into a solution of 5% caustic soda or dilute sulfuric acid to form the fibers, which are then decoppered and washed. Cuprammonium rayon is available in fibers of very low deniers and is used almost exclusively in textiles.

The foregoing processes for preparing rayon both require that the cellulose be chemically derivatized or complexed in order to render it soluble and therefore capable of being spun into fibers. In the viscose process, the cellulose is derivatized, while in the cuprammonium rayon process, the cellulose is complexed. In either process, the derivatized or complexed cellulose must be regenerated and the reagents that were used to solubilize it must be removed. The derivatization and regeneration steps in the production of rayon significantly add to the cost of this form of cellulose fiber. Consequently, in recent years attempts have been made to identify solvents that are capable of dissolving underivatized cellulose to form a dope of underivatized cellulose from which fibers can be spun.

One class of organic solvents useful for dissolving cellulose are the amine-N oxides, in particular the tertiary amine-N oxides. For example, Graenacher, in U.S. Pat. No. 2,179,181, discloses a group of amine oxide materials suitable as solvents. Johnson, in U.S. Pat. No. 3,447,939, describes the use of anhydrous N-methylmorpholine-N-oxide (NMMO) and other amine N-oxides as solvents for cellulose and many other natural and synthetic polymers. Franks et al., in U.S. Pat. Nos. 4,145,532 and 4,196,282, deals with the difficulties of dissolving cellulose in amine oxide solvents and of achieving higher concentrations of cellulose.

Lyocell is an accepted generic term for a fiber composed of cellulose precipitated from an organic solution in which no substitution of hydroxyl groups takes place and no chemical intermediates are formed. Several manufacturers presently produce lyocell fibers, principally for use in the textile industry. For example, Acordis, Ltd. presently manufactures and sells a lyocell fiber called Tencel® fiber.

Currently available lyocell fibers are produced from high quality wood pulps that have been extensively processed to remove non-cellulose components, especially hemicellulose. These highly processed pulps are referred to as dissolving grade or high alpha (or high $\alpha$) pulps, where the term alpha (or $\alpha$) refers to the percentage of cellulose. Thus, a high alpha pulp contains a high percentage of cellulose, and a correspondingly low percentage of other components, especially hemicellulose. The processing required to generate a high alpha pulp significantly adds to the cost of lyocell fibers and products manufactured therefrom. Typically, the cellulose for these high alpha pulps comes from softwood, which generally has longer fibers than hardwoods. Softwoods must be made into wood chips to make them suitable to be pulped in the digesters. The digesters are normally equipped with a system for recycle of the black liquor. Recycle provides a desirable homogenous mixture throughout the digester that leads to uniform pulping conditions. In order to move the black liquor, digesters are equipped with screens to keep wood chips from the pump inlet.

Since conventional Kraft processes stabilize residual hemicelluloses against further alkaline attack, it is not possible to obtain acceptable quality dissolving pulps, i.e., high alpha pulps, through subsequent treatment of Kraft pulp in the bleaching stages. Thus, in order to prepare dissolving type pulps by the Kraft process, it is necessary to give the raw material an acidic pretreatment before the alkaline pulping stage. A significant amount of material primarily hemicellulose, on the order of 10% or greater of the original wood substance, is solubilized in this acid phase pretreatment and thus process yields drop. Under the prehydrolysis conditions, the cellulose is largely resistant to attack, but the residual hemicelluloses are degraded to a much shorter chain length and can therefore be removed to a large extent in the subsequent Kraft cook by a variety of hemicellulose hydrolysis reactions or by dissolution.

A relatively low copper number, reflective of the relative carbonyl content of the cellulose, is a desirable property of a pulp that is to be used to make lyocell fibers because it is generally believed that a high copper number causes cellulose and solvent degradation, before, during, and/or after dissolution in an amine oxide solvent. The degraded solvent can either be disposed of or regenerated; however, due to its cost it is generally undesirable to dispose of the solvent. Regeneration of the solvent suffers from the drawback that the regeneration process involves dangerous, potentially explosive conditions.

A low transition metal content is a desirable property of a pulp that is to be used to make lyocell fibers because, for example, transition metals accelerate the undesirable degradation of cellulose and NMMO in the lyocell process.

In view of the expense of producing commercial dissolving grade pulps, it would be desirable to have alternatives to conventional high alpha dissolving grade pulps as a lyocell raw material. In addition, pulp manufacturers would like to minimize the capital investment necessary to produce such types of pulps by utilizing existing capital plants.

In order to control lyocell fiber properties, lyocell manufacturers utilize dopes that comprise a blend of different pulps having different ranges of average degree of polymerization values. In view of this, there is also a need for pulp manufacturers to produce pulps having an average degree of polymerization within a broad band to eliminate the need for blending.

Thus, there is a need for relatively inexpensive, low alpha (e.g., high yield) pulps that can be used to make lyocell fibers, for a process of making the foregoing low alpha pulps using capital equipment that is currently available to pulp manufacturers, and for lyocell fibers from the foregoing low alpha pulp. Preferably, the desired low alpha pulps will have a desirably low copper number, a desirably low lignin content and a desirably low transition metal content but broad molecular weight distribution.

In a prior application having a Ser. No. 09/256,197, the disclosure of which is herein incorporated by reference, assigned to the assignee of the present application, various methods of reducing D.P. values and copper number of a Kraft pulp are described. Such methods include treating pulp with acid, or an acid substitute, or a combination of acids and acid substitutes. Other means of treating the pulp to reduce the average D.P. of cellulose without substantially reducing the hemicellulose content described in the prior application include treatment of the pulp with steam, a combination of ferrous sulfate and hydrogen peroxide, at least one transition metal and peracetic acid, an alkaline chlorine dioxide treatment which ends acidic or a sodium hypochlorite treatment which ends near neutral. Such processes are effective at reducing the average degree of polymerization without substantially reducing the hemicellulose content, however, such processes can be expensive from a capital improvement standpoint if the existing pulp mills in which such processes are to be used are not configured to allow for the simple deployment of such processes. In the prior application, additional steps are described in order to reduce the copper number of the pulp which has been treated to reduce its average degree of polymerization without substantially decreasing the hemicellulose content. The need for this subsequent copper number reducing step arose because the methods described in the prior application for reducing the average degree of polymerization for the cellulose resulted in an increase in the copper number for the resultant pulp.

In view of environmental concerns, there has been a great interest in using bleaching agents, which reduce the amount of chlorocompounds that must be recovered from process streams. In recent years, the use of oxygen as a delignifying agent has occurred on a commercial scale. Examples of equipment and apparatus useful for carrying out an oxygen stage delignification are described in U.S. Pat. Nos. 4,295,927; 4,295,925; 4,298,426; and 4,295,926.

While the methods described in prior application '197 are effective at reducing the average D.P. of cellulose without substantially decreasing the hemicellulose content, a further need still existed for a process that did not require a separate copper number reducing step and which was readily adaptable to pulp mills that include oxygen reactors, multiple alkaline stages and/or alkaline conditions suitable for substantial D.P. reduction of bleached or semi-bleached pulp. In a more recent application having Ser. No. 09/574,538, assigned to the assignee of the present application, the disclosure of which is herein incorporated by reference, the assignee of the present application discovered how to make a highly desirable low viscosity pulp from an alkaline pulp by treatment of the alkaline pulp under conditions of an oxidizing agent in a medium to high consistency reactor to reduce the D.P. of the cellulose, without substantially reducing the hemicellulose or increasing the copper number.

Presently, the forest industry generates vast quantities of sawdust byproduct in the normal course of day-to-day wood processing. While some sawdust has found its way into pulping mills that use digesters made to be used with sawdust, a large proportion of the total byproduct sawdust remains unused. Even so, the conventional pulp made from sawdust in M&D or Pandia digesters is considered unsuitable to be used as a dissolving type pulp. One of the drawbacks to using sawdust in a digester suited to make high alpha pulp is that the recycle stream continuously plugs with the sawdust particulates. The typical sawdust pulp currently being made therefore does not have a high alpha content or viscosity level suitable for use as dissolving pulp. The typical sawdust pulp also contains contaminates (dirt, metal or plastic) that are unacceptable for dissolving grade pulps.

The need to conserve resources by utilizing sawdust byproducts, however, presents a unique opportunity. It would be advantageous to develop a pulp and method using the conventional sawdust digesters to produce a dissolving type pulp that would be useful for making lyocell molded bodies from the byproducts of wood processing, with none of the heretofore mentioned drawbacks.

SUMMARY OF THE INVENTION

As used herein, the terms "composition(s) of the present invention", or "composition(s) useful for making lyocell fibers", or "treated pulp" refer to pulp, containing cellulose and hemicellulose, that has been treated under alkaline conditions that reduce the average degree of polymerization (D.P.) of the cellulose without substantially reducing the hemicellulose content of the pulp or substantially increasing the copper number for the pulp. The compositions of the present invention preferably possess additional properties as described herein.

Compositions of the present invention are compositions useful for making lyocell fibers, or other molded bodies such as films, having a high hemicellulose content, a medium to low copper number and short fiber lengths, including cellulose that has a low average D.P. Preferably, the cellulose and hemicellulose are derived from wood, but more preferably from softwood. The present invention preferably uses sawdust as a raw material, since being a byproduct makes it economically more attractive than wood chips. Producing wood chips on site at a mill is a capital intensive proposition. However, the present invention may also use wood chips as a raw material source. Additionally, the compositions of the present invention exhibit a variety of desirable properties including a low lignin content, a broad molecular weight distribution and a low transition metal content. Compositions of the present invention may be in a form that is adapted for storage or transportation, such as in a sheet, roll or bale. Compositions of the present invention may be mixed with other components or additives to form a dope useful for making lyocell molded bodies, such as fiber or films. Further, the present invention provides processes for making compositions useful for making lyocell fibers having a desirable high hemicellulose content, a medium to low copper number and short fiber lengths, including cellulose that has a low average D.P.

The present invention also provides lyocell fibers containing cellulose having a low average D.P., a high proportion of hemicellulose short fibers, and a medium to low copper number, a broad molecular weight distribution, and a low lignin content. The lyocell fibers of the present invention also preferably possess a low transition metal content.

Compositions of the present invention can be made in a continuous digester, using an alkaline cook liquor, followed by an alkaline D.P. reduction step. The cook liquor can be Kraft or soda. Preferably the brownstock pulp is a Kraft softwood pulp, and still more preferably a pulp made in an M&D or Pandia digester using Kraft liquor and operating under conditions of short cook times and high temperatures. Compositions of the present invention include at least 7% by weight hemicellulose, preferably from 7% by weight to about 35% by weight hemicellulose, more preferably from 7% by weight to about 20% by weight hemicellulose, most preferably from about 10% by weight to about 17% by weight hemicellulose, and cellulose having an average D.P. of from about 200 to about 1100, preferably from about 300 to about 1100, and more preferably from about 400 to about 700. Compositions of the present invention can have the combination of hemicellulose ranges and cellulose D.P. ranges mentioned above in addition to having a copper number less than about 2.0, wherein greater than 4% of the pulp fibers have a length-weighted average fiber length less than 2.0 mm.

A first embodiment of a composition made according to the present invention includes at least 7% hemicellulose, contains cellulose having an average degree of polymerization of from about 200 to about 1100, a copper member less than about 2.0, and greater than 4% of the pulp fibers have a length-weighted fiber length less than 2.0 mm. Hemicellulose content is measured by a sugar content assay based on TAPPI Standard T249 hm-85. Further, compositions of the present invention have a kappa number of less than 2, preferably less than 1. Most preferably, compositions of the present invention contain little to no detectable lignin. Lignin content is measured using TAPPI Test T236 cm-85.

Compositions of the present invention preferably have a unimodal distribution of cellulose D.P. values wherein the individual D.P. values are approximately normally distributed around a single, modal D.P. value, i.e., the modal D.P. value being the D.P. value that occurs most frequently within the distribution. The distribution of cellulose D.P. values may, however, be multimodal i.e., a distribution of cellulose D.P. values that has several relative maxima. A multimodal, treated pulp of the present invention might be formed, for example, by mixing two or more unimodal, treated pulps of the present invention that each have a different modal D.P. value. The distribution of cellulose D.P. values is determined by means of proprietary assays performed by Thuringisches Institution für Textil-und Kunstoff Forschunge. V., Breitscheidstr. 97, D-07407 Rudolstadt, Germany.

Compositions of the present invention have greater than 4% of pulp fibers with a length-weighted fiber length of less than 2.0 mm, owing to the raw material source, which can be sawdust or hardwood. Length-weighted fiber length is the sum of fiber lengths divided by the total length. The length-weighted fiber length is suitably measured by a FQA machine, model No. LDA93-R704, with software version 2.0, made by the Optest Company of Hawkesbury, Ontario, Canada.

Compositions of the present invention which have been treated to reduce their D.P. without substantially reducing the hemicellulose content of the pulp, exhibit a desirably broad molecular weight distribution as evidenced by a difference between $R_{10}$ and $R_{18}$ values ($\Delta R$) of greater than or equal to about 2.8.

Additionally, compositions of the present invention preferably have a relatively low carbonyl content as evidenced by a copper number of less than about 2.0, more preferably less than about 1.6, as measured by TAPPI Standard T430. Further, compositions of the present invention preferably have a carbonyl content of less than about 60 µmol/g and a carboxyl content of less than about 60 µmol/g, more preferably, a carbonyl content less than 30 µmol/g and a carboxyl content less than about 30 µmol/g. The carboxyl and carbonyl group content are measured by means of proprietary assays performed by Thuringisches Institut für Textil-und Kunstoff Forschunge. V., Breitscheidstr. 97, D-07407 Rudolstadt, Germany, referred to below as TITK.

Compositions of the present invention also preferably possess a low transition metal content. Preferably, the total transition metal content of the compositions of the present invention is less than 20 ppm, more preferably less than 10 ppm, as measured by Weyerhaeuser Test Number AM5-PULP-1/6010. The term "total transition metal content" refers to the combined amounts, measured in units of parts per million (ppm), of nickel, chromium, manganese, iron and copper. Preferably the iron content of the compositions of the present invention is less than 8 ppm, more preferably less than 4 ppm, as measured by Weyerhaeuser Test AM5-PULP-1/6010, and the copper content of the compositions of the present invention is preferably less than 1.0 ppm, more preferably less than 0.5 ppm, as measured by Weyerhaeuser Test AM5-PULP-1/6010.

Compositions of the present invention are readily soluble in amine oxides, including tertiary amine oxides such as NMMO or NMMO monohydrate. Other preferred solvents that can be mixed with NMMO, or another tertiary amine solvent, include dimethylsulfoxide (D.M.S.O.), dimethylacetamide (D.M.A.C.), dimethylformamide (D.M.F.) and caprolactan derivatives. Preferably, compositions of the present invention fully dissolve in NMMO monohydrate in less than about 10 minutes, preferably in about 5 minutes or less or even within 2 minutes, utilizing the dissolution procedure described in Example 2 below. The term "fully dissolve", when used in this context, means that substantially no undissolved particles are seen when a dope, formed by dissolving compositions of the present invention in NMMO, is viewed under a light microscope at a magnification of 40× to 100×.

A first preferred embodiment of the treated pulp of the present invention is a treated alkaline pulp including at least 7% by weight hemicellulose, a copper number less than about 2.0, cellulose having an average degree of polymerization of from about 200 to about 1100, and greater than 4% of the pulp fibers have an average length-weighted fiber length of less than 2.0 mm.

Lyocell fibers formed from compositions of the present invention include at least about 5% by weight hemicellulose, preferably from about 5% by weight to about 22% by weight hemicellulose, more preferably from about 5% by weight to about 18% by weight hemicellulose, most preferably from about 10% by weight to about 15% by weight hemicellulose, cellulose having an average D.P. of from about 200 to about 1100, more preferably from about 300 to about 1100, most preferably from about 400 to about 700, and a lignin content providing a kappa number less than about 2.0 and more preferably less than about 1.0. Lyocell fibers of the present invention are made from a treated pulp having greater than 4% of pulp fibers having a length-weighted fiber length less than 2.0 mm. Additionally, lyocell fibers of the present invention can have a unimodal distribution of cellulose D.P. values, although lyocell fibers of the present invention may also have a multimodal distribution of cellulose D.P. values, i.e., a distribution of cellulose D.P. values that has several relative maxima. Lyocell fibers of the present invention having a multimodal distribution of cellulose D.P. values might be formed, for example, from a mixture of two or more unimodal, treated pulps of the present invention that each have a different modal D.P. value. Lyocell fibers of the present invention can have a ΔR of greater than or about equal to 2.8.

Preferred lyocell fibers of the present invention have a copper number of less than about 2.0, more preferably less than about 1.6, as measured by TAPPI Standard T430. Further, preferred lyocell fibers of the present invention have a carbonyl content of less than about 60 µmol/g and a carboxyl content of less than about 60 µmol/g, more preferably a carbonyl content less than about 30 µmol/g and a carboxyl content of less than about 30 µmol/g. The carboxyl and carbonyl group content are measured by means of proprietary assays performed by Thuringisches Institut für Textil-und Kunstoff Forschunge. V., Breitscheidstr. 97, D-07407 Rudolstadt, Germany. Additionally, lyocell fibers of the present invention have a total transition metal content of less than about 20 ppm, more preferably less than about 10 ppm, as measured by Weyerhaeuser Test Number AM5-PULP-1/6010. The term "total transition metal content" refers to the combined amount, expressed in units of parts per million (ppm), of nickel, chromium, manganese, iron and copper. The iron content of lyocell fibers of the present invention is less than about 8 ppm, more preferably less than about 4 ppm, as measured by Weyerhaeuser Test AM5-PULP-1/6010, and the copper content of lyocell fibers of the present invention is preferably less than about 1 ppm, more preferably less than about 0.5 ppm, as measured by Weyerhaeuser Test AM5-PULP-1/6010.

Preferred embodiments of the lyocell fibers of the present invention possess desirable elongation properties. Lyocell fibers of the present invention possess a dry elongation of from about 8% to about 20%. Lyocell fibers of the present invention possess a wet elongation of from about 10% to about 18%. Elongation is measured by means of proprietary assays performed by Thuringisches Institut für Textil-und Kunstoff Forschunge. V., Breitscheidstr. 97, D-07407 Rudolstadt, Germany. Lyocell fibers produced from treated pulps of the present invention have exhibited dry tenacities on the order of about 20-48 cN/tex and wet tenacities on the order of 18-40 cN/tex as measured by the proprietary assays performed by Thuringisches Institut für Textil-und Kunstoff Forschunge.

In another aspect, the present invention provides processes for making compositions of the present invention that can, in turn, be formed into lyocell molded bodies, such as fibers or films. In this aspect, the present invention provides a process that includes pulping a raw material in a digester to provide a brownstock alkaline pulp, wherein the raw material comprises sawdust in an amount greater than 0% up to 100%, and then contacting the alkaline pulp comprising cellulose and at least about 7% hemicellulose under alkaline conditions with an amount of an oxidant sufficient to reduce the average D.P. of the cellulose to within the range of from about 200 to about 1100, preferably to within the range of from about 300 to about 1100, more preferably to within the range of from about 400 to about 700, without substantially reducing the hemicellulose content or increasing the copper number. Pulps which are to be treated according to the present invention with an oxidant to achieve the D.P. reduction without substantially reducing the hemicellulose content or increasing the copper number as discussed above preferably have a kappa number less than 40, more preferably less than 30 and most preferably less than 25 when they are contacted for the first time with the oxidant. The hemicellulose content is reduced by less than 50%, more preferably by less than 15% and most preferably by less than 5%. The copper number increases by less than 50%, and more preferably by less than about 25%. The reduction in the average degree of polymerization of the cellulose can occur in the presence of a ratio of magnesium to transition metals of less than 50%.

This D.P. reduction treatment can occur after the pulping process and before, during or after a bleaching step, if a bleaching step is utilized. The oxidant under alkaline conditions is any oxidant containing a peroxide group such as hydrogen peroxide, oxygen, chlorine dioxide and ozone and any combination thereof. Preferably the oxidant is a combination of oxygen and hydrogen peroxide, or hydrogen peroxide alone. A further step can include contacting the pulp with an alkali source, such as sodium hydroxide, oxidized white liquor, and unoxidized white liquor and any combination thereof, at or above a pH of about 8.0. After the step of contacting the pulp and oxidant to make a composition of the present invention, the composition can be dissolved in any of the aforementioned solvents to form a dope. The compositions of the present invention are readily dissolved in NMMO-monohydrate within 5 minutes, preferably within about 2 minutes. The process of the present invention can be carried out in a continuous digester capable of handling sawdust, such as an M&D or Pandia-type digester; and therefore, sawdust in any amount greater than 0% to up to 100% of the raw material can be used. Alternatively, wood chips having short fiber lengths, such as hardwoods, may also be used. A suitable raw material sawdust contains less than or about 50% of fibers retained on a one-quarter inch screen, as measured by TAPPI standard 233, preferably less than 30%, and more preferably less than 15%. Alternatively, a combination raw material of sawdust and wood chips can be used where the sawdust makes up about 50% to about 100% of the raw material. However, wood chips can make up the whole of the raw material provided the fiber tracheids are comparable to sawdust fiber tracheids.

Preferably the yield of the D.P. reducing step of the present invention is greater than about 95%, more preferably greater than about 98%. The process yield is the dry weight of the treated pulp produced by the process divided by the dry weight of the starting material pulp, the resulting fraction being multiplied by one hundred and expressed as a percentage (this percentage does not include the amount of lignin loss during the stage).

In another aspect of the present invention, a process for making lyocell fibers includes the steps of (a) pulping a raw material in a digester to provide an alkaline pulp wherein the raw material comprises sawdust in an amount greater than 0% up to 100%; (b) contacting the alkaline pulp including cellulose and at least about 7% hemicellulose under alkaline conditions with an amount of an oxidant sufficient to reduce the average degree of polymerization of the cellulose to the range of from about 200 to about 1100, preferably to the range of from about 200 to about 1100, without substantially reducing the hemicellulose content or increasing the copper number of the pulp; and (c) forming fibers from the pulp treated in accordance with step (b). In accordance with this aspect of the present invention, the lyocell fibers are preferably formed by a process selected from the group consisting of melt blowing, centrifugal spinning, spun-bonding and a dry jet/wet process.

The process uses an oxidant selected from the group consisting of a chemical with a peroxide group, hydrogen peroxide, oxygen, chlorine dioxide, ozone, and any combination thereof. The step of reducing the average degree of polymerization of the cellulose occurs in the presence of a ratio of magnesium to transition metals of less than about 50%. The hemicellulose content is reduced less than about 15%, the copper number increases less than 25%, and the contacting step can occur in the substantial absence of an inhibitor to degradation of cellulose by the oxidant. The step of contacting can further occur at a pH of greater than about 8.0. A further step of the process can include dissolving the pulp in a solvent before forming the fiber. The characteristic of the pulp being that it is readily dissolving in NMMO-monohydrate within about 10 minutes by the test performed in Example 3 of the present specification.

In a preferred embodiment of a process according to the present invention, sawdust is used as the raw material, and the sawdust is digested in an M&D or Pandia continuous digester using short cook times and high temperatures to produce an alkaline pulp. Sawdust is a readily available, often-discarded byproduct. Combining a continuous sawdust pulping process with a pulp post treatment according to the invention, activated dissolving type pulps can be made more economically than by conventional high alpha dissolving pulps. Thus fulfilling a need to conserve dwindling landfill space while at the same time preserving natural resources through the use of sawdust. Pulps and lyocell fibers according to the invention can be made by any raw material having as much as 100% sawdust. The sawdust to make the pulp and fibers is measured by TAPPI Standard 233, and can include about 50% of fibers retained on a ¼ inch mesh screen.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
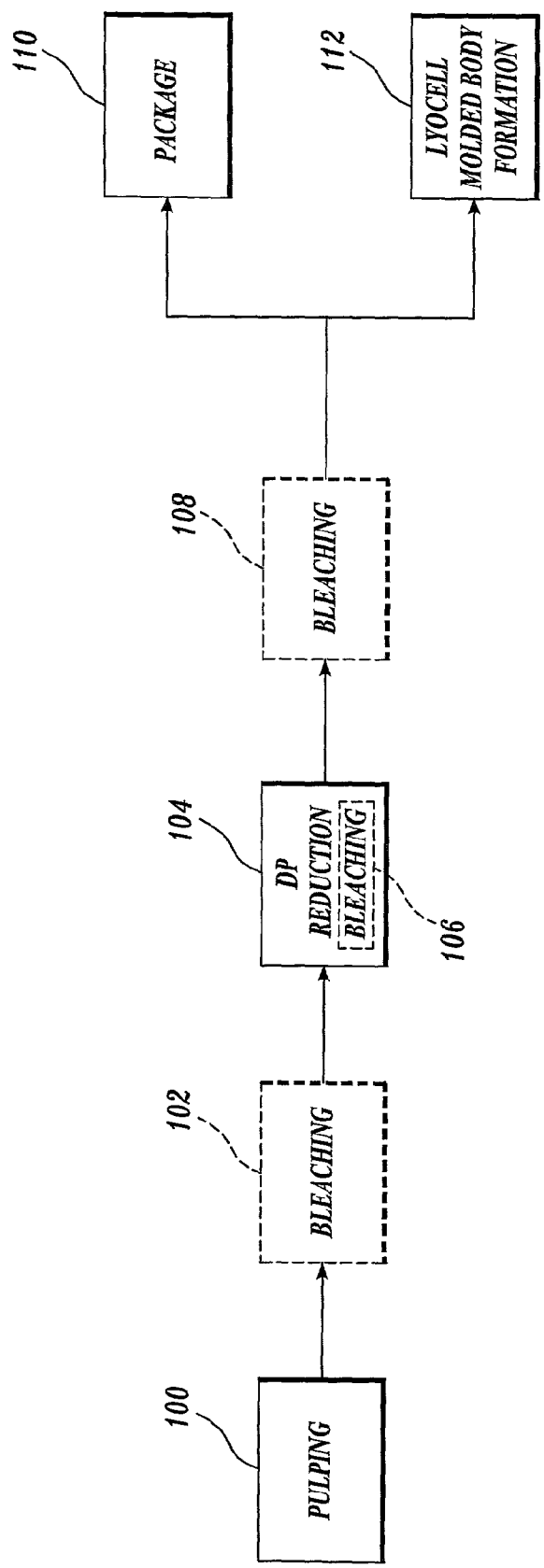
FIG. 1 is a schematic diagram of the presently preferred process for converting a raw material, preferably sawdust, to a composition of the present invention useful for making lyocell molded bodies.

Heretofore, the size of the wood particles useful for making dissolving pulps via an alkaline process was thought to be an important parameter. The existing facilities of many pulping mills making dissolving pulps have been designed with a particular sized wood chip being the basis for the design. For example, most if not all digesters presently making dissolving pulps out of wood chips have a recycle stream to recycle black liquor to provide more homogeneous conditions in the digester. In order to accomplish this, a screen is necessary to prevent the wood chips from entering the liquor recycle loop. The present digesters in these mills are thus not suitable to accept small particulate wood matter, such as sawdust, since the sawdust would clog the recycle screens and upset the digester conditions. Thus, the process according to the present invention makes use of a digester typically not considered useful for making dissolving pulps and combines this digester with a pulp treatment to make a composition useful for making lyocell molded bodies. The digester is a continuous digester, such as a Pandia or an M&D digester or other similarly designed type of digester. These digesters typically do not require a recycle stream and thus there are no screens to plug, making them suitable to pulp sawdust. Continuous digesters typically have a feed nozzle at an upper portion of the vessel and an exit nozzle at a lower portion. However, other continuous digesters can have both the feed and exit nozzle at the upper portion, lower portion or other suitable arrangements. Continuous digesters are also typically, but not always, operated at pressures above atmospheric pressure.

Pulping breaks down wood into its components of cellulose, hemicellulose and lignin into more or less discrete fibers by either chemical or mechanical methods. Once raw cellulose fibers have been separated, further treatment in a bleach plant can define one or more characteristics of the pulp. That is not to say, however, that conditions in the pulping stage cannot affect the properties of finished pulp. The source and size of the woody material used to produce pulp also have an impact on the resulting pulp product. Softwood includes wood from trees from the subdivision of Spermatophytes, known as Gymnosperms, more commonly known as conifers. Hardwood includes wood from trees from the subdivision of Spermatophytes, known as Angiosperms, also called broadleaf. Softwoods are characterized by fiber tracheids of between about 2.5 to 7 mm long. Most softwoods have fiber tracheids that average 3 to 3.6 mm, while hardwoods have fiber tracheids of between about 0.9 to 1.5 mm. Pulps made from softwood are highly desirable in the manufacture of lyocell articles. Fiber length adds strength to the molded lyocell article. Sawdust, on the other hand, is composed of small fiber tracheids, regardless of whether its source is softwood or hardwood. Conventionally, it was thought undesirable to use sawdust pulp for lyocell body formation, because of the corresponding loss in strength. According to the present invention, sawdust pulps can be manufactured which do have a short fiber length, but nonetheless have been shown to produce suitable lyocell molded bodies having suitable strength properties.

Sawdust is generally understood to be the small-particle wood residue generated by lumber-cutting operations, such as by the use of a saw blade. Other small wood particles such as chip screen fines and pin chips are often referred to as sawdust as well. Small particles generated either from lumber sawing operations or chip screening operations are considered to be sawdust. Sawdust generally has many impurities and residual metals because of contact with saw or abrading equipment. Mostly, sawdust is used as an absorbent, and has had little use as raw material for pulps. When sawdust pulp is produced, the majority is pulped using either of the aforementioned continuous processes. Unlike conventionally sized wood chips, sawdust must be pulped in digesters specially designed to handle smaller particle sizes. These digesters are designed to have significant lower residence time, higher liquor-to-wood ratios and higher cooking temperatures unlike conventional digesters used to make dissolving pulps. This is because the surface area of sawdust in comparison to wood chips can be 10 to 50 times or greater, and the permeability of the sawdust to the cooking liquid is very rapid. Suitable digesters to use in the present invention are an M&D (Messing and Durkee) or Pandia digester. Other digesters of similar design exist and may be also used. Conventional digesters presently making dissolving pulp are unsuited to handle the short cook times needed for sawdust.

Prior to undertaking the discussion of the methods and products of the present invention, it is beneficial to describe the preferred sizes of sawdust useful in the practice of the invention. As used herein, "sawdust" includes any collection of small wood particles from any known softwood or hardwood. The particle size distribution of sawdust from lumber sawing operations is determined by sawing variables such as saw thickness, saw speed, saw tooth design, and saw diameter. As such, the size distribution will vary depending on the design of the lumber sawing operation producing the sawdust.

In addition to particles produced from sawn kerf in lumber producing operations, sawdust also includes other small wood particles such as chip screen fines and pin chips. Screen fines are removed from wood chips prior to pulping by a screen having openings of 3–15 mm diameter holes, interface or inter-roll distances for blade, disk and roll screens, diagonal or rectangular screen openings are also within about the same range.

Several authorities have put forth a quantitation method for sawdust. In one method, the sawdust is classified by the fractions of a sawdust sample successively retained on a particular mesh size. An example of a sawdust sample measurement is given in the following fractions and mesh screen sizes, where a positive (+) sign means the percentage of the initial sample retained on the screen, and a negative (−) sign means the percentage of the initial sample that passed through the screen: +¼ inch mesh is 2 to 4%, +6 mesh is 4 to 5%, +10 mesh is 27 to 24%, +20 mesh 36 to 38%, and −20 mesh is 28 to 32%. This means that 2 to 4% of the sawdust sample did not pass through the ¼ inch mesh screen, and so on. The negative (−) sign indicates the percentage of smaller particles passing through the 20 mesh screen. In another sawdust sample measurement, the same authority quantifies the sawdust by TAPPI standard T233, also commonly referred to as Bauer McNett, which measures the fiber sizes from the sawdust. The sawdust sample resulted in the following quantification: +¼ inch screen is 4 to 18%, +35 screen is 12%, +65 screen is 49–57%, +150 screen is 17 to 22%, and −150 screen is 4–5. 1997 TAPPI Forest Biology Wood Chemistry Conference, Walter J. Bublitz and Jerry L. Hull. Another authority reported the following Bauer McNett fiber fractions of a sawdust sample: 24.3% retained on 14 mesh, 26.7% retained on 28 mesh, 43.2% retained on 100 mesh, 5.2% retained on 200 mesh, and 0.6% passed through 200 mesh. For comparison only, pulp from mixed hardwood chips contained the following fractions: 0.2% retained on 14 mesh, 12.8% retained on 28 mesh, 66.2% retained on 100 mesh, 6.6% retained on 200 mesh, and 14.2% passed through 200 mesh. Pulp and Paper, Feb. 1979, Cecil M. Bail, pp. 105–109. Another authority reported the following Tyler Sieve analysis for sawdust particles: 19.2% retained on 4 mesh, 28.0% retained on 8 mesh, 14.7% retained on 10 mesh, 21.6% retained on 20 mesh, 10.5% retained on 35 mesh, and 6.0% was collected in the pan. The same authority also uses Bauer McNett to report fiber classification: +12 mesh is 1%, +28 mesh is 45%, +48 mesh is 24%, +100 mesh is 12%, and −100 is 18%. For comparison only, the chip pulp fiber classification is: +12 is 47%, +28 is 34%, +48 is 8%, +100 is 3%, and −100 is 8%. Pulp and Paper Canada, Jan. 1997, T. G. Taylor, pp. 53–57.

As used herein, sawdust will be defined to mean any collection of wood particles from any softwood or hardwood having no more than a 50% fraction of a representative sample retained on a ¼ inch screen as measured by TAPPI standard T233. Sawdust may include conventionally sized chips of all sizes provided that the fiber sizes of the wood chips meet the fiber length classification for a sawdust as defined. While the examples given above have been described with reference to particular embodiments, they are not meant to be limiting of the invention which makes use of a raw material having small wood particles, which also may include any quantity of conventionally sized wood chips as part of the 50% fraction retained on a ¼ mesh screen.

The raw material, such as sawdust, useful in the practice of the present invention, contains cellulose and hemicellulose. Sources of sawdust useful in the practice of the present invention include, but are not limited to trees. The sawdust used in the practice of the present invention, from whatever source, is initially converted to a pulp using an alkaline pulping process, such as the Kraft or soda process modified for an M&D, Pandia or other similar type of continuous digester.

There are basically two types of reactors to be used for pulping, batch and continuous. Conventional batch reactors containing a recycle stream provide adequate pulping of wood chips, however, in order to provide a recycle stream to provide a homogeneous mixture, screens must be placed on the recycle line to prevent wood chips from entering the pump. In order to produce a dissolving pulp from sawdust, a way of avoiding the plugging of screens in the recycle line had to be resolved. The method according to the present invention solves this problem by providing a dissolving pulp from sawdust using a continuous rector, such as M&D or Pandia. These types of reactors, continuously remove liquor, and then either recover or discard the used liquor unlike the current batch processing of wood chips.

The preferred method for pulping the sawdust into the alkaline pulp includes the use of a continuous digester such as an M&D or Pandia digester, such as the one described in U.S. Pat. No. 3,586,600, which is herein incorporated by reference. These digesters have been typically used in sawdust pulping, however, not for making dissolving pulps. It is not beyond the scope of the present invention to utilize a batch reactor as well, provided it is suitable to accept the small wood particles found in sawdust. The pulping step produces an alkaline chemical wood pulp, preferably an unbleached continuously digested Kraft wood pulp, containing cellulose and at least about 7% hemicellulose, that has not been exposed to acid hydrolysis conditions or any other heterogeneous mixture conditions (i.e., reaction time, temperature, and acid concentration), where cellulose glycosidic bonds are broken. Alternatively, a bleaching step can be employed before, during and after the D.P. reduction step to produce a bleached continuously digested Kraft wood pulp, containing cellulose and at least 7% hemicellulose, that has not been exposed to acid hydrolysis conditions or any other heterogeneous mixture conditions, where cellulose glycosidic bonds are broken. Both unbleached and bleached pulps can be further treated according to the present invention to arrive at a composition useful for making lyocell molded bodies. "Continuously digested" is being used to signify that the pulp is being made in a continuous digester, such as an M&D or Pandia or other similar digester, heretofore, known to be used for pulping sawdust, but not as a method of making dissolving pulp, which is an object of the present invention. The present invention uses Kraft cooking liquor in the continuous digester. The process according to the invention employs shorter cook times and higher temperatures. Cook time will vary depending on wood particle size, digester size, throughput rate, level and strength of the cooking liquor and temperature. However, a suitable range is on the order of about 30 to about 90 minutes; preferably, on the order of 60 minutes. The cook temperatures will also vary depending on the above-mentioned variables but a suitable temperature is generally on the order of about 180° C. or higher. It should be readily apparent to one skilled in the art that time and temperature can be lower or higher depending on the variables set forth previously. The cooking liquor is similar to that for a typical Kraft cook and includes a mixture of sodium sulfide and sodium hydroxide. After the sawdust has been converted to a continuously digested Kraft wood pulp in accordance with the present invention, it is processed to reduce its average D.P. without substantially reducing its hemicellulose content or increasing its copper number according to the present invention.

In the wood pulping industry, trees are conventionally classified as either hardwood or softwood. In the practice of the present invention, sawdust can be derived from softwood tree species such as, but not limited to: fir (preferably Douglas fir and Balsam fir), pine (preferably Eastern white pine and Loblolly pine), spruce (preferably White spruce), larch (preferably Eastern larch), cedar, and hemlock (preferably Eastern and Western hemlock). Examples of hardwood species from which sawdust can also be derived include, but are not limited to: acacia, alder (preferably Red alder and European black alder) aspen (preferably Quaking aspen), beech, birch, oak (preferably White oak), gum trees (preferably eucalyptus and Sweetgum), poplar (preferably Balsam poplar, Eastern cottonwood, Black cottonwood and Yellow poplar), gmelina and maple (preferably Sugar maple, Red maple, Silver maple and Bigleaf maple). Sawdust may also be derived from other sources containing cellulose, which generates small particulate matter.

Wood from softwood or hardwood species generally includes three major components: cellulose, hemicellulose and lignin. Cellulose makes up about 50% of the woody structure of plants and is an unbranched polymer of D-glucose monomers. Individual cellulose polymer chains associate to form thicker microfibrils which, in turn, associate to form fibrils which are arranged into bundles. The bundles form fibers which are visible as components of the plant cell wall when viewed at high magnification under a light microscope. Cellulose is highly crystalline as a result of extensive intermolecular and intramolecular hydrogen bonding.

The term hemicellulose refers to a heterogeneous group of low molecular weight carbohydrate polymers that are associated with cellulose in wood. Hemicelluloses are amorphous, branched polymers, in contrast to cellulose which is a linear polymer. The principal, simple sugars that combine to form hemicelluloses are: D-glucose, D-xylose, D-mannose, L-arabinose, D-galactose, D-glucuronic acid and D-galacturonic acid.

Lignin is a complex aromatic polymer and comprises about 30% to 50% of wood where it occurs as an amorphous polymer.

In the pulping industry, differences in the chemistry of the principal components of wood are exploited in order to purify cellulose. For example, heated water in the form of steam causes the removal of acetyl groups from hemicellulose with a corresponding decrease in pH due to the formation of acetic acid. At elevated temperatures of about 150° C.–180° C., acid hydrolysis of the carbohydrate components of wood then ensues, with a lesser hydrolysis of lignin. Hemicelluloses are especially susceptible to this acid hydrolysis, and most of the hemicellulose can be degraded by an initial steam, prehydrolysis step in the Kraft pulping process, as described in the Background, or in an acidic sulfite cooking process. However, the removal of significant quantities of hemicellulose is disfavored in the present invention.

With respect to the reaction of wood with alkali solutions, all components of wood are susceptible to degradation by strong alkaline conditions. At the elevated temperature of 140° C. or greater that is typically utilized during Kraft wood pulping, the hemicelluloses and lignin are preferentially degraded by dilute alkaline solutions. In continuous digesters, such as an M&D or Pandia digester, the temperature is much higher, being on the order of about 180° C. to about 190° C. The high temperature leads to rapid degradation and a corresponding decrease in cellulose D.P. This is advantageous from the standpoint of achieving a dissolving pulp. Additionally, all components of wood can be oxidized by bleaching agents such as chlorine, sodium hypochlorite and hydrogen peroxide.

The alkaline pulping step that is carried out in a continuous digester can be used to provide a continuously digested brownstock alkaline pulp that can be further treated as explained below to provide an alkaline pulp useful for making lyocell fibers.

A typical Kraft bleaching sequence can contain a chlorine dioxide stage or multiple chlorine dioxide stages with a pH less than 4 and a temperature greater than about 70° C., but the combined heterogeneous mixture conditions (i.e., reaction time, temperature and acid concentration) of such stages are not suitable to induce substantial DP reduction in cellulose. By avoiding an acid pretreatment step prior to alkaline pulping, according to the invention, the overall cost of producing the alkaline pulps is reduced. Further, by avoiding acid prehydrolysis, the degradation of hemicellulose is averted and the overall yield of the pulping process can be increased. By employing a continuous digester, inexpensive sources of cellulose and hemicellulose, such as sawdust, may be used to produce a pulp suitable for conversion into lyocell molded bodies. As used herein the phrase alkaline pulp refers to pulp containing cellulose and hemicellulose that has not been subjected to any combination of acidic conditions or any other heterogeneous mixture conditions that would result in breaking of the cellulose glycosidic bonds before or during the pulping process wherein the sawdust is converted to fibers.

Characteristics of a continuously digested brownstock alkaline pulp suitable for use in the D.P. reduction step of the present invention include a pulp having a hemicellulose content of at least 7% by weight, preferably from 7% to about 30% by weight, more preferably from 7% to about 25% by weight, and most preferably from about 9% to about 20% by weight; an average D.P. of cellulose of from about 600 to about 1800; a kappa number less than about 40 preferably less than 30 and more preferably less than 25, and a copper number less than about 2.0. As used herein, the term "percent (or %) by weight" or "weight percent", or grammatical variants thereof, when applied to the hemicellulose or lignin content of pulp, means weight percentage relative to the dry weight of the pulp.

Referring to FIG. 1, the process for providing a composition according to the present invention is illustrated. The process includes a block 100 for pulping a raw material, the manner of pulping previously indicated as using a continuous digester. Hereinafter, raw material(s) will mean the cellulosic materials introduced into the front end of the process prior to pulping. The raw materials may undergo further treatment or processing before they are fed into the pulping digester 100. Provided, that the raw materials do not undergo any form of treatment that substantially reduces the hemicellulose content. From the digester, the pulp can optionally be washed or screened. The Brownstock pulp is further treated according to the invention to reduce its D.P. without substantially reducing hemicellulose, in a reactor whereby the average D.P. of the cellulose is reduced, without substantially reducing the hemicellulose content or increasing the copper number, to provide the alkaline pulps of the present invention in block 104. In this context, the term "without substantially reducing the hemicellulose content" means without reducing the hemicellulose content by more than about 50%, preferably not more than about 15%, and most preferably not more than about 5% during the D.P. reduction step. The term "degree of polymerization" (abbreviated as D.P.) refers to the number of D-glucose monomers in a cellulose molecule. Thus, the term "average degree of polymerization", or "average D.P.", refers to the average number of D-glucose molecules per cellulose polymer in a population of cellulose polymers. This D.P. reduction treatment can occur after the pulping process in block 102 and before, after or substantially simultaneously with the bleaching process, if a bleaching step is utilized, in blocks 102, 108, and 106 respectively. In this context, the term "substantially simultaneously with" means that at least a portion of the D.P. reduction step occurs at the same time as at least a portion of the bleaching step. Preferably the average D.P. of the cellulose is reduced to a value within the range of from about 200 to about 1100; more preferably to a value within the range of from about 300 to about 1100; most preferably to a value of from about 400 to about 700. Unless stated otherwise, D.P. is determined by ASTM Test 1301–12. A D.P. within the foregoing ranges is desirable because, in the range of economically attractive operating conditions, the viscosity of the dope, i.e., the solution of treated pulp from which lyocell fibers are produced, is sufficiently low that the dope can be readily extruded through the narrow orifices utilized to form lyocell fibers, yet not so low that the strength of the resulting lyocell fibers is substantially compromised. Preferably the range of D.P. values of the treated pulp will be unimodal and will have an approximately normal distribution that is centered around the modal D.P. value.

Copper number is a measure of the carboxyl content of pulp. The copper number is an empirical test used to measure the reducing value of cellulose. The copper number is expressed in terms of the number of milligrams of metallic copper which is reduced from cupric hydroxide to cuprous oxide in an alkaline medium by a specified weight of cellulosic material.

In this application, the term "without substantially increasing the copper number" means without increasing the copper number by more than about 100%, preferably not more than about 50% and most preferably not more than about 25% during the D.P. reduction step. The degree to which the copper number changes during the D.P. reduction step is determined by comparing the copper number of the digested pulp entering the D.P. reduction step and the copper number of the treated pulp after the D.P. reduction step. A low copper number is desirable because it is generally believed that a high copper number causes cellulose and solvent degradation during and after dissolution of the treated pulp to form a dope. However, there is some evidence to suggest that the carbonyl content of pulps, such as those of the present invention, containing a relatively high amount of branched polymers, such as hemicelluloses, do not see appreciable solvent degradation, even with a high copper number. It is believed that the carbonyls at the chain ends do not appreciably cause solvent degradation, even with a high copper number. Since a high hemicellulose pulp has many chain ends with corresponding carbonyls, a much higher carbonyl content and thus copper number can be tolerated for these high hemicellulose pulps as opposed to high alpha pulps. Thus, the carbonyl content and copper number can be higher for high hemicellulose pulps as opposed to high alpha pulps. It is also generally assumed that a high copper number results in a less thermally stable pulp; however, this assumption may eventually be proved incorrect. In some extremely low D.P. pulps, of about 190 to 450 D.P., a copper number greater than 2, may not be a true indication of thermal instability. Pulps with copper numbers as high as 4 can still be thermally stable, provided, the copper number is more a measure of the carbonyl content of the chain ends, rather than the carbonyl content between chain ends.

The hemicellulose content of the treated alkaline pulp of the present invention, expressed as a weight percentage is at least 7% by weight; preferably from about 7% by weight to about 25% by weight; more preferably from about 7% by weight to about 20% by weight; most preferably from about 10% by weight to about 17% by weight. As used herein, the term "percent (or %) by weight" or "weight percentage", or grammatical equivalents thereof, when applied to the hemicellulose or lignin content of treated pulp, means weight percentage relative to the dry weight of the treated pulp.

The pulps of the present invention have greater than 4% of fibers with a length-weighted fiber length of less than 2.0 mm. This is attributed, in part, from the raw material used, such as sawdust or hardwood.

The pulps of the present invention exhibit an $\Delta R$ of greater than or about equal to 2.8. Treated pulps of U.S. application Ser. No.09/574,538, which is herein incorporated by reference, exhibit a $\Delta R$ of less than 2.8. Pulps in accordance with the teachings of U.S. application Ser. No. 09/256,197 exhibit a $\Delta R$ of greater than 2.8, however, also have a copper number exceeding 2.0. After treatment to reduce the copper number to below 2.0 in accordance with the '197 application, the $\Delta R$ for the pulps of prior application '197 is reduced to less than about 2.8.

$R_{10}$ refers to the residual undissolved material that is left after attempting to dissolve the pulp in a 10% caustic solution. $R_{18}$ refers to the residual amount of undissolved material left after attempting to dissolve the pulp in an 18% caustic solution. Generally, in a 10% caustic solution, hemicellulose and chemically degraded short chain cellulose are dissolved and removed in solution. In contrast, generally only hemicellulose is dissolved and removed in an 18% caustic solution. Thus, the difference between the $R_{10}$ value and the $R_{18}$ value represents the amount of chemically degraded short chained cellulose that is present in the pulp sample. Providing a pulp having a relatively broad molecular weight distribution of at least equal to or greater than about 2.8 is desirable from the standpoint of being able to provide customers with pulp which may not require blending with pulps of other molecular weight distribution to arrive at the desired composition.

Without intending to be bound by theory, it is believed that the chemical form of the hemicellulose in pulps treated in accordance with the present invention is distinct from the chemical form of hemicellulose in pulps that have been exposed to acidic conditions or heterogeneous mixture conditions described above which result in the breaking of cellulose glycosidic bonds, such as the pulps described in prior application Ser. No. 09/256,197 and commercially available dissolving grade pulps. This difference in chemical form may be evidenced by the D.P. of the hemicellulose in the pulp of the present invention compared to the D.P. of the hemicellulose of the pulp of the prior application or commercial dissolving grade pulps. This D.P. difference can be observed when the respective pulps are derivatized (acetylated) and tested in the accordance with the discussion by S. A. Rydholm in Pulping Processes, Interscience Publishers, 1965. The higher D.P. hemicellulose in treated alkaline pulps of the present invention may be less likely to be extracted from lyocell filaments during the filament formation process or post treatment of the formed lyocell filament as compared to the hemicellulose of the pulps of the prior application '197 or commercially available dissolving grade pulps.

A presently preferred method of treating pulp in order to reduce the average D.P. of the cellulose without substantially reducing the hemicellulose content of the pulp and without substantially increasing the copper number of the pulp is to treat the pulp under alkaline conditions in high consistency or medium consistency reactor(s) where the pulp is contacted with an oxidant containing a peroxide group such as oxygen, hydrogen peroxide, chlorine dioxide, ozone or combinations thereof. Preferably the oxidant is a combination of oxygen and hydrogen peroxide or hydrogen peroxide alone. This treatment step has been described in the patent application Ser. No. 09/574,538. The present invention is the addition of a continuously digested brownstock pulp from sawdust to provide a more economical route to a pulp useful in lyocell production.

The pulps formed in accordance with the present invention which have been treated in order to reduce their average degree of polymerization values without substantially decreasing the hemicellulose content or the copper number for the pulp can be produced by contacting the pulp in a reactor with an oxidant under conditions suitable to achieve the desired results described above. Suitable reactors include reactors conventionally used as oxygen reactors in a Kraft process. Examples of reactors capable of carrying out the contacting of the pulp with the oxidant are described in U.S. Pat. Nos. 4,295,925; 4,295,926; 4,298,426; 4,295,927, each of which is herein incorporated by reference. Unlike conventional oxygen reactors which are configured and operated under conditions that preferably do not decrease the average degree of polymerization of cellulose while at the same time remove lignin, applicants' invention is designed to operate a reactor under conditions that reduce the average degree of polymerization of the cellulose without substantially reducing the hemicellulose content or increasing the copper number of the cellulose. In accordance with the present invention, the reactor can be a high consistency reactor wherein the consistency of the feedstream to the reactor is greater than about 20% or it can be a medium consistency reactor where the consistency ranges between about 8% up to about 20%. The conditions under which a high consistency reactor or a medium consistency reactor is typically operated in order to achieve the desired results of the present invention relate primarily to operation of the high consistency reactor at a temperature that is slightly higher than the temperature at which the medium consistency reactor can be operated as described below in more detail.

Examples of oxidants that can be employed have been described above. Preferred oxidants include hydrogen peroxide alone or a combination of oxygen and hydrogen peroxide. The amount of oxidant employed should provide the desired D.P. reduction and lignin removal given the time and temperature conditions employed. Examples of suitable ranges for oxygen and hydrogen peroxide are given below. Preferably, for a high consistency reactor, the oxygen is present in an amount ranging from about 0 to the maximum pressure rating for the reactor, preferably about 0 to about 85 psig, and more preferably, from about 40 to about 60 psig. The hydrogen peroxide may be present in an amount ranging from greater than about 0.75 weight percent up to about 5.0 weight percent, more preferably about 1.0 to about 2.5 weight percent.

In medium consistency reactors, the oxygen can be present in an amount ranging from about 0 to about 100 pounds per ton of the pulp, more preferably, about 50 to about 80 pounds per ton of pulp. The hydrogen peroxide may be present in an amount ranging from greater than about 0.75 weight percent up to about 5 weight percent, more preferably from about 1.0 to about 2.5 weight percent.

In addition to the oxidants, caustic is preferably contacted with the pulp in the reactor as a buffering agent. The source of caustic can be sodium hydroxide or other materials such as unoxidized white liquor or oxidized white liquor. The amount of caustic added will depend in part upon the kappa number of the untreated pulp. Generally, as the kappa number increases, more caustic is added. The amount of caustic introduced can vary depending on process conditions, with an amount of 4 to 5 weight percent or greater being suitable.

The temperature at which the reactor is operated will in part depend upon the concentration of the oxidants. When the oxidants are used in amounts that fall within the ranges described above, temperatures on the order of about 80° C. up to about 130° C. are suitable. It should be understood that the temperature in the reactor may vary over time as the reactions that occur therein tend to be exothermic which will most likely result in an increase of the temperature of the reactor. It should be understood that temperatures and oxidant concentrations falling outside the ranges described above may still provide suitable results depending on the various permutations of the amounts of oxidant used and the temperatures.

In accordance with the present invention, the stage or stages used to reduce the average degree of polymerization of the pulp without substantially decreasing the hemicellulose content or increasing the copper number of the pulp remains alkaline through the stage or stages. Preferably, the pH of the stage or stages used to achieve the D.P. reduction described above is greater than about 8.0 throughout the D.P. reduction process. It should be understood that pHs above or below the noted ranges may provide satisfactory results if the temperature or concentration of oxidant is modified as necessary.

A presently preferred method of treating pulp in order to reduce the average D.P. of the cellulose without substantially reducing the hemicellulose content of the pulp and without substantially increasing the copper number of the pulp is to treat the pulp in a series of stages. In one embodiment, the pulp undergoes treatment in a DEDE sequence. E stages are the principal stages used in lowering the average D.P. of the cellulose without substantially reducing the hemicellulose content of the pulp or raising the copper number.

In the first D stage, the pulp consistency is adjusted to about 10% with the addition of water. Chlorine dioxide corresponding to an amount equivalent to about 28.4 pounds per ton of pulp is added to the dissolved pulp. The mixture is held at a temperature of about 75° C. for about 1.5 hours.

In the second E stage, the pulp consistency is maintained at about 10% with the addition of water. Sodium hydroxide was charged to the reactor in an amount equivalent to about 30 pounds per ton of pulp. Hydrogen peroxide was charged to the reactor in an amount equivalent to about 60 pounds per ton of pulp. The mixture is held for about 1.5 hours at a temperature of about 88° C.

In the third D stage, chlorine dioxide is charged to the pulp in an amount equivalent to about 19 pounds per ton, and the pulp was again diluted to bring the consistency to about 10%. The mixture was held for 1.5 hours at about 75° C.

In the fourth EP stage, sodium hydroxide was charged to the pulp with water being added to achieve a consistency of about 10%. The sodium hydroxide charge was equivalent to about 30 pounds per ton of pulp. Hydrogen peroxide is also charged in an amount equivalent of about 40 pounds per ton. The mixture is held for about 1.5 hours at a temperature of about 88° C.

In accordance with the present invention, it is preferred that contact between the pulp and the oxidant occur prior to any acid wash or chelation stage normally used to remove transition metals. Unlike prior art processes which intentionally sought to remove transition metals which were believed to result in decomposition of hydrogen peroxide into cellulose-degrading intermediates that negatively impacted the viscosity of the cellulose, applicants have discovered that they can take advantage of the presence of naturally occurring transition metals in the wood to partially degrade the hydrogen peroxide to produce intermediates that react with the cellulose to reduce its average degree of polymerization without substantially decreasing the hemicellulose content or increasing the kappa number. In addition, unlike prior art processes that use magnesium sulfate as a means of inhibiting the degradation of cellulose, applicants prefer not to introduce magnesium sulfate into the reactor or upstream therefrom so that the pulp is contacted with the oxidant(s) in the substantial absence of an inhibitor to the degradation of the cellulose by the oxidant. If magnesium sulfate is present in the pulp prior to the reactor, it is preferred that the ratio of magnesium to the transition metals be less than 50% on a weight percent basis.

When a brownstock sawdust wood pulp containing cellulose and at least 7% hemicellulose having a copper number of about 2.0 or less is contacted with an oxidant under the conditions set forth above, a treated pulp is produced having a D.P. ranging from about 200 to about 1,100, containing at least 7% by weight hemicellulose, having a copper number less than about 2.0 and a percentage of fibers which have a length weighted average fiber length of about 2.0 mm, of greater than 4%. It should be understood that the description above of particular conditions under which a bleached or unbleached wood pulp can be contacted with an oxidant to reduce its average degree of polymerization without substantially reducing the hemicellulose content or increasing the copper number are exemplary and that other conditions can provide suitable results and still fall within the scope of the present invention. In addition, it should be understood that in some situations, the pulp exiting the D.P. reduction stage may be suitable for use in producing a dope for manufacture of lyocell fibers; however, in other situations, subsequent process stages such as bleaching stages may be desirable provided that subsequent stages do not result in a significant decrease in the hemicellulose content or a significant increase in the copper number of the pulp. In addition, as noted above, in some situations, it may be necessary or advantageous to subject the pulp which has been exposed to an oxidant in a first stage to a second, third or even more stages of contact with an oxidant in order to further reduce the degree of polymerization of the cellulose without substantially reducing the hemicellulose content or increasing the copper number thereof.

Again with reference to FIG. 1, once the alkaline pulp has been treated with oxidants in a reactor in accordance with the present invention, the treated pulp can either be washed in water and transferred to a bath of organic solvent, such as NMMO, for dissolution prior to lyocell molded body formation, block 112. Alternatively, the treated washed pulp can be dried and broken into fragments for storage and/or shipping in block 110.

A desirable feature of the treated pulps of the present invention is that the cellulose fibers remain substantially intact after treatment. Consequently, the treated pulp has a freeness and a fines content that are similar to those of the untreated pulp.

Another desirable feature of the treated pulps of the present invention is their solubility in organic solvents, such as tertiary amine oxides including NMMO or NMMO monohydrate. Rapid solubilization of the treated pulp prior to spinning lyocell fibers is important in order to reduce the time required to generate lyocell fibers, or other molded bodies such as films, and hence reduce the cost of the process. Further, efficient dissolution is important because it minimizes the concentration of residual, undissolved particles, and partially dissolved, gelatinous material, which can reduce the speed at which fibers can be spun, tend to clog the spinnerets through which lyocell fibers are spun, and may cause breakage of the fibers as they are spun. Conventional pulps, on the other hand, must be made more soluble by chemical additives. On the contrary, the treated pulps produced according to the present invention are dissolved readily within at least 60 minutes under some circumstances, depending on the type of solvent.

While not wishing to be bound by theory, it is believed that the processes of the present invention utilized to reduce the average D.P. of the cellulose also permeabilize the secondary layer of the pulp fibers, thereby permitting the efficient penetration of solvent throughout the pulp fiber. The secondary layer is the predominant layer of the cell wall and contains the most cellulose and hemicellulose. The short fibers attributed to sawdust pulp also enhance the penetration of solvent into the fiber. A strong synergy between mechanical macro structure damage to the raw material and chemical nature (dissolution rate or activation) of the pulp produced from this raw material exists.

Further, compositions of the present invention preferably have a carbonyl content of less than about 60 µmol/g and a carboxyl content of less than about 60 µmol/g, more preferably, a carbonyl content of less than about 30 µmol/g and a carboxyl content of less than 30 µmol/g. The carboxyl and carbonyl group content are measured by means of proprietary assays performed by Thuringisches Institut für Textil- und Kunstoff Forschunge. V., Breitscheidstr. 97, D-07407 Rudolstadt, Germany. As an alternative to determining the carbonyl content of the pulp using the proprietary TITK assays, pulp samples and a thermally stable, low-carbonyl group pulp can be analyzed by FTIR and the differences in the spectrums between the two samples can provide an indication of the existence of carbonyl groups and the thermal stability of the pulp.

Additionally, the treated pulp of the present invention preferably has a low transition metal content. Transition metals are undesirable in treated pulp because, for example, they accelerate the degradation of cellulose and NMMO in the lyocell process. Examples of transition metals commonly found in treated pulp derived from trees include iron, copper, nickel and manganese. Preferably, the total transition metal content of the compositions of the present invention is less than about 20 ppm, more preferably less than about 10 ppm. Preferably the iron content of the compositions of the present invention is less than about 8 ppm, more preferably less than about 4 ppm, as measured by Weyerhaeuser Test AM5-PULP-1/6010, and the copper content of the compositions of the present invention is preferably less than about 1.0 ppm, more preferably less than about 0.5 ppm, as measured by Weyerhaeuser Test AM5-PULP-1/6010.

In order to make lyocell fibers, or other molded bodies, such as films, from the treated pulp of the present invention, the treated pulp is first dissolved in an amine oxide, preferably a tertiary amine oxide. Representative examples of amine oxide solvents useful in the practice of the present invention are set forth in U.S. Pat. No. 5,409,532. The presently preferred amine oxide solvent is N-methyl-morpholine-N-oxide (NMMO). Other representative examples of solvents useful in the practice of the present invention include dimethylsulfoxide (D.M.S.O.), dimethylacetamide (D.M.A.C.), dimethylformamide (D.M.F.) and caprolactan derivatives. The treated pulp is dissolved in amine oxide solvent by any art-recognized means such as are set forth in U.S. Pat. Nos. 5,534,113; 5,330,567 and 4,246,221. The dissolved, treated pulp is called dope. The dope is used to manufacture lyocell fibers, or other molded bodies, such as films, by a variety of techniques, including melt blowing, spun-bonding, centrifugal spinning, dry-jet wet, and other methods. Examples of techniques for making a film from the compositions of the present invention are set forth in U.S. Pat. No. 5,401,447 to Matsui et al., and in U.S. Pat. No. 5,277,857 to Nicholson.

Figure 2:
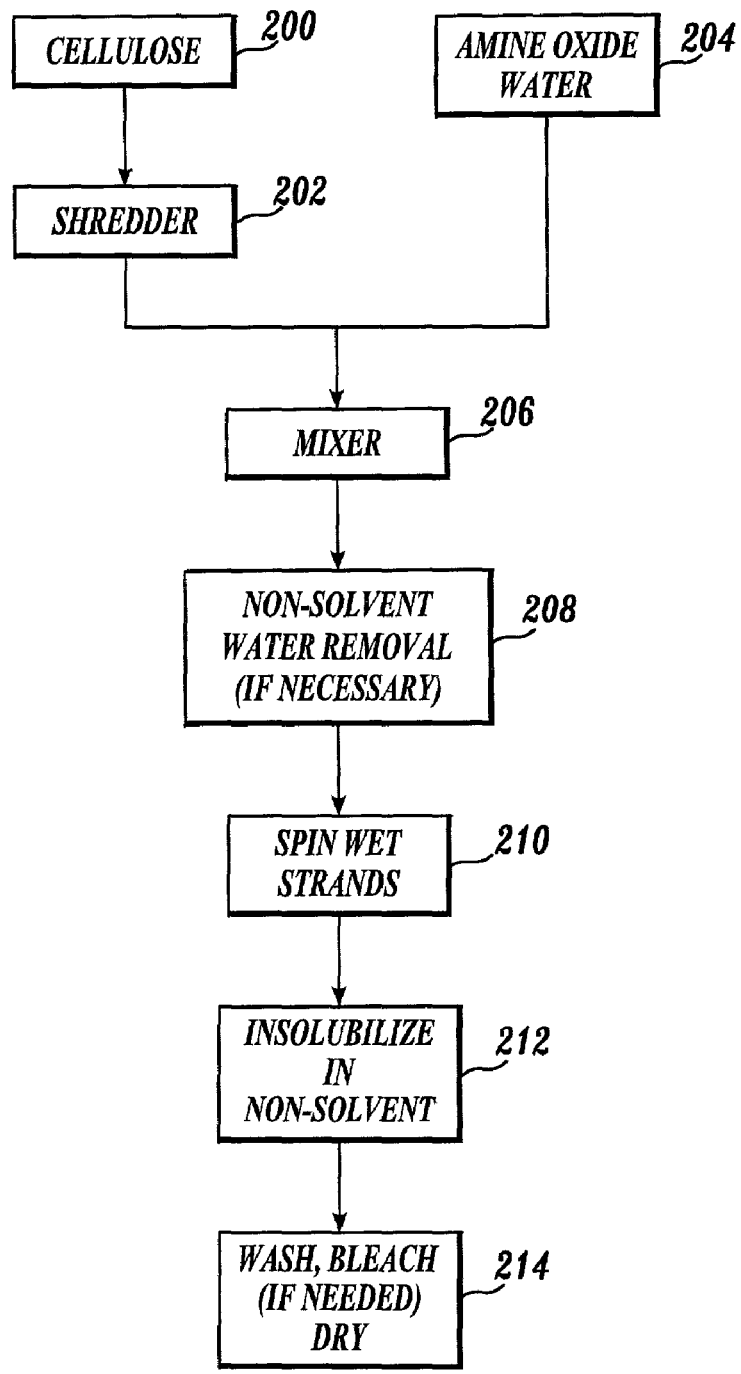
FIG. 2 is a schematic diagram of the steps of the presently preferred process of forming fibers from the compositions of the present invention.

One useful technique for making lyocell fibers from dope involves extruding the dope through a die to form a plurality of filaments, washing the filaments to remove the solvent, and drying the lyocell filaments. FIG. 2 shows a block diagram of the presently preferred process for forming lyocell fibers from the treated pulps of the present invention. The term "cellulose" in block 200 refers to the compositions of the present invention. If necessary, the cellulose in the form of treated pulp is physically broken down, for example by a shredder in block 202, before being dissolved in an amine oxide-water mixture to form a dope, blocks 204 and 206. The treated pulp of the present invention can be dissolved in an amine solvent by any known manner, e.g., as taught in McCorsley U.S. Pat. No. 4,246,221. The treated pulp can be wet in a nonsolvent mixture of about 40% NMMO and 60% water. The mixture can be mixed in a double arm sigma blade mixer and sufficient water distilled off to leave about 12–14% based on NMMO so that a cellulose solution is formed in block 208. Alternatively, NMMO of appropriate water content may be used initially to obviate the need for the vacuum distillation. This is a convenient way to prepare spinning dopes in the laboratory where commercially available NMMO of about 40–60% concentration can be mixed with laboratory reagent NMMO having only about 3% water to produce a cellulose solvent having 7–15% water. Moisture normally present in the pulp should be accounted for in adjusting necessary water present in the solvent. Reference might be made to articles by Chanzy, H. and A. Peguy, *Journal of Polymer Science, Polymer Physics Ed.* 18:1137-1144 (1980), and Navard, P. and J. M. Haudin, *British Polymer Journal*, p. 174 (Dec. 1980) for laboratory preparation of cellulose dopes in NMMO water solvents.

The dissolved, treated pulp (now called the dope) is forced through extrusion orifices, called spinning, block 210, to produce latent filaments or fibers that are later regenerated in block 212. Finally, the lyocell fibers can be washed and/or bleached if needed in block 214.

Owing to the compositions from which they are produced, lyocell fibers produced in accordance with the present invention have a hemicellulose content that is equal to or less than the hemicellulose content of the treated pulp that was used to make the lyocell fibers. Typically the lyocell fibers produced in accordance with the present invention have a hemicellulose content that is from about 0% to about 30.0% less than the hemicellulose content of the treated pulp that was used to make the lyocell fibers. Lyocell fibers produced in accordance with the present invention have an average D.P. that is equal to, larger than or less than the average D.P. of the treated pulp that was used to make the lyocell fibers. Depending on the method that is used to form lyocell fibers, the average D.P. of the pulp may be further reduced during fiber formation, for example through the action of heat. Preferably the lyocell fibers produced in accordance with the present invention have an average D.P. that is equal to, or from about 0% to about 20% less than or greater than the average D.P. of the treated pulp that was used to make the lyocell fibers.

The lyocell fibers of the present invention exhibit numerous desirable properties. For example, lyocell fibers prepared from treated pulps of the present invention comprise at least about 5 weight percent hemicellulose, cellulose having an average degree of polymerization from about 200 to about 1100, a kappa number less than about 2.0, and greater than 4% of fibers have a length-weighted average fiber length of 2.0 mm. The fibers produced according to the invention exhibit a $\Delta R$ greater than or equal to about 2.8. Preferably, such fibers have a hemicellulose content ranging from about 5% by weight to about 27% by weight and more preferably from about 5% by weight to about 18%, most preferably from about 10% by weight to about 15% by weight. The average degree of polymerization of the cellulose preferably ranges from about 300 to about 1000, more preferably from about 300 to about 1100 and most preferably from about 400 to about 700. These fibers exhibit a copper number of less than about 2.0, and more preferably less than about 1.6. A lyocell fiber made according to the present invention can have a dry elongation from about 8% to about 20%, a wet elongation from about 10% to about 18%, a dry tenacity from about 20 to about 48 cN/tex and a wet tenacity from about 18 to about 40 cN/tex. However, the aforementioned range of properties is measured by the proprietary assays performed by Thuringisches Institut für Textil-und Kunstoff Forschunge and thus, different assays may produce different values for the same pulp. The properties of lyocell fibers made according to the present invention can be varied by adjusting one or plurality of conditions within the following ranges. For example, the cellulose (i.e., pulp) concentration in dope can be about 7% to about 30%; the spinning temperature can be about 80° C. to about 130° C.; the spinning rate can be about 40 to about 1000 meters/min., the air-gap can be about 1 to about 50 cm; the draw ratio (defined as winder speed/filament speed at the exit of the nozzle) can be about 1 to about 500; and anti-oxidants can be added to the dope solution in an amount about 5% or less by weight. Suitable anti-oxidants can include propyl-gallate or the like. However, other parameters, such as the temperature of the dope or the spinneret can also influence lyocell fiber properties.

Lyocell fibers of the present invention formed from dopes prepared from treated pulp of the present invention exhibit physical properties making them suitable for use in a number of woven and non-woven applications. Examples of woven applications include textiles, fabrics and the like. Non-woven applications include filtration media and absorbent products by way of example.

Additionally, the treated pulp of the present invention can be formed into films by means of techniques known to one of ordinary skill in the art. An example of a technique for making a film from the compositions of the present invention is set forth in U.S. Pat. No. 5,401,447 to Matsui et al., and in U.S. Pat. No. 5,277,857 to Nicholson.

The following examples merely illustrate the best mode now contemplated for practicing the invention, but should not be construed to limit the invention.

EXAMPLE 1

Brownstock sawdust pulp was produced in an industrial scale M&D digester. The digester was operated at a temperature of about 182° C., and average residence time in the digester was about 60 minutes. White liquor was used as the cooking liquor in the digester. The white liquor had a total titratable alkali (TTA) of 115.2 grams per liter as $Na_2O$, an active alkali (AA) of 99.2 grams per liter as $Na_2O$, an effective alkali (EA) of 81.6 grams per liter as $Na_2O$. Sulfidity of the white liquor was 28% of TTA. Specific gravity of the white liquor was 1.15.

Northern Softwood sawdust unbleached alkaline Kraft pulp (main wood species were Douglas fir, Spruce and Lodgepole pine), produced under the stated conditions, with a kappa number of 21.0 (TAPPI Standard T236 cm-85 and a viscosity of 110 cp (TAPPI T230) (D.P. of 1264), a copper number of 0.6 and a hemicellulose content of 14.1% ±1.5% was treated with chlorine dioxide in a first D stage.

D1 Stage

The D1 stage treated pulp processed by pin fluffing the sawdust brownstock pulp, and then transferring the pulp to a polypropylene bag. The consistency of the pulp in the polypropylene bag was adjusted to ten percent with the addition of water. Chlorine dioxide corresponding to an amount equivalent to 28.4 pounds per ton of pulp was introduced to the diluted pulp by dissolving the chlorine dioxide in the water used to adjust the consistency of the pulp in the bag. The bag was sealed and mixed and then held at 75° C. for 1.5 hours in a water bath. The exit pH was 1.9 and no $ClO_2$ residual was detected. The pulp D.P. was 1258. The pulp was removed and washed with dionized water. The pulp was next treated in an EP stage.

EP1 Stage

The washed pulp from D1 stage was then placed in a fresh polypropylene bag and caustic was introduced with one-half of the amount of water necessary to provide a consistency of ten percent. Hydrogen peroxide was mixed with the other one-half of the dilution water and added to the bag. The hydrogen peroxide charge was equivalent to 60 pounds per ton of pulp and the caustic dose was equivalent to 30 pounds per ton of pulp. The bag was sealed and mixed and held for 1.5 hours at 88° C. in a water bath. Only a trace of residual hydrogen peroxide was detected. The exit pH was 8.1 and pulp D.P. was 905. After removing the pulp from the bag and washing it with water, the mat was filtered and then placed back into the polypropylene bag and broken up by hand. The pulp was next treated in a second D2.

D2 Stage

Chlorine dioxide was introduced to the pulp in an amount equivalent to 19 pounds per ton of pulp with the dilution water necessary to provide a consistency of 10 percent. The bag was sealed and mixed, and then held for 1.5 hours at 75° C. in a water bath. The exit pH was 2.6, and the pulp D.P. was 923. After removing the pulp from the bag and washing it with water, the mat was filtered and then placed back into the polypropylene bag and broken up by hand. The pulp was next treated in a second EP stage.

EP2 Stage

The washed pulp was then placed in a fresh polypropylene bag and caustic was introduced with one-half of the amount of water necessary to provide a consistency of ten percent. Hydrogen peroxide was mixed with the other one-half of the dilution water and added to the bag. The hydrogen peroxide charge was equivalent to 40 pounds per ton of pulp and the caustic dose was equivalent to 30 pounds per ton of pulp. The bag was sealed and mixed and held for 1.5 hours at 88° C. in a water bath. Residual hydrogen peroxide was detected at <10 pounds per ton. Exit pH was 11.7 and pulp D.P. was 579.

The treated pulp had a copper number of about 1.4 measured by TAPPI standard T430, a hemicellulose content of 14.1 percent ±1.5%, R10 80.9%, R18 84.5% and carboxyl content of 4.0 meq/100g (28 micro mol/gram TITK method). Final brightness of 88 ISO was achieved. The resulting fiber analysis yielded a length-weighted average fiber length (LWAFL) of 1.3 mm, and a coarseness of 15 mg/100 mm.

EXAMPLE 2

NMMO Monohydrate Dissolution Test

Figure 3:
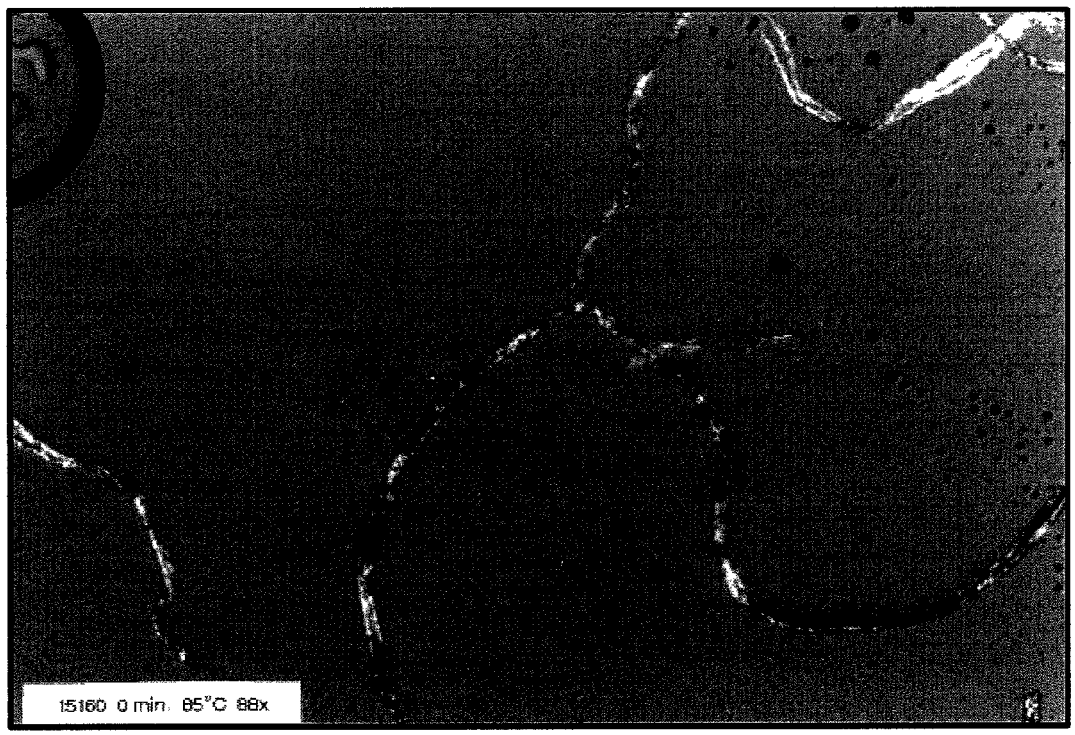
FIG. 3 is a micrograph of a wood chip pulp fiber made by the process of application Ser. No. 09/574,538.
Figure 4:
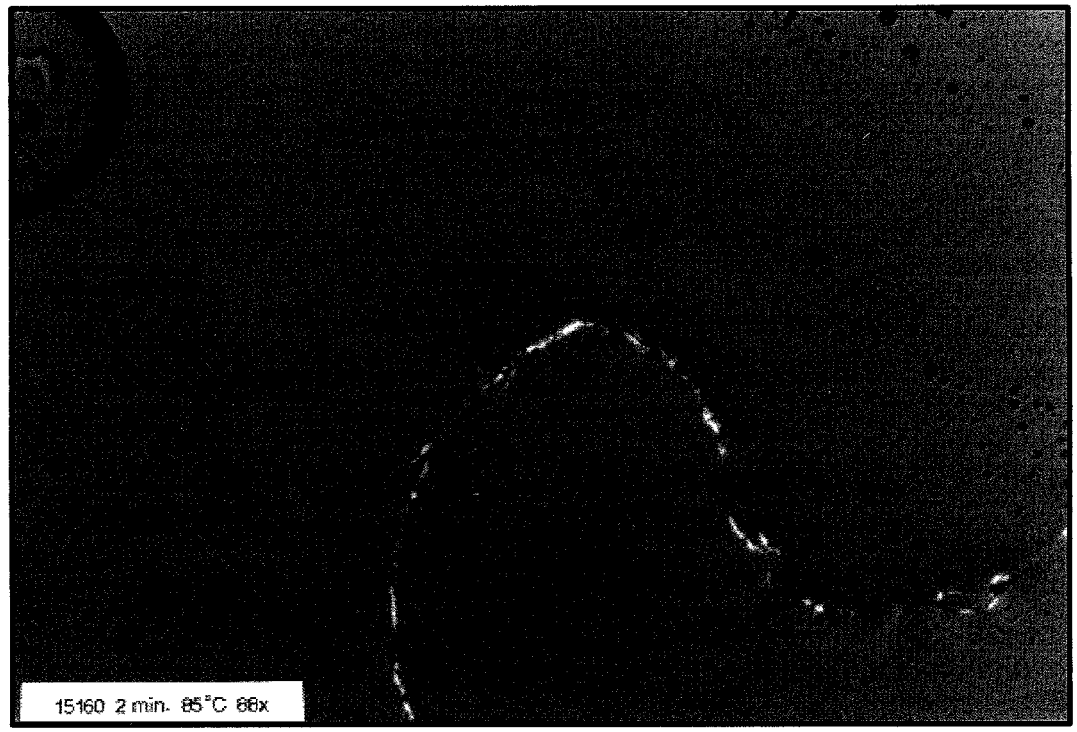
FIG. 4 is a micrograph of the fiber of FIG. 3 after 2 minutes of a dissolution test.
Figure 5:
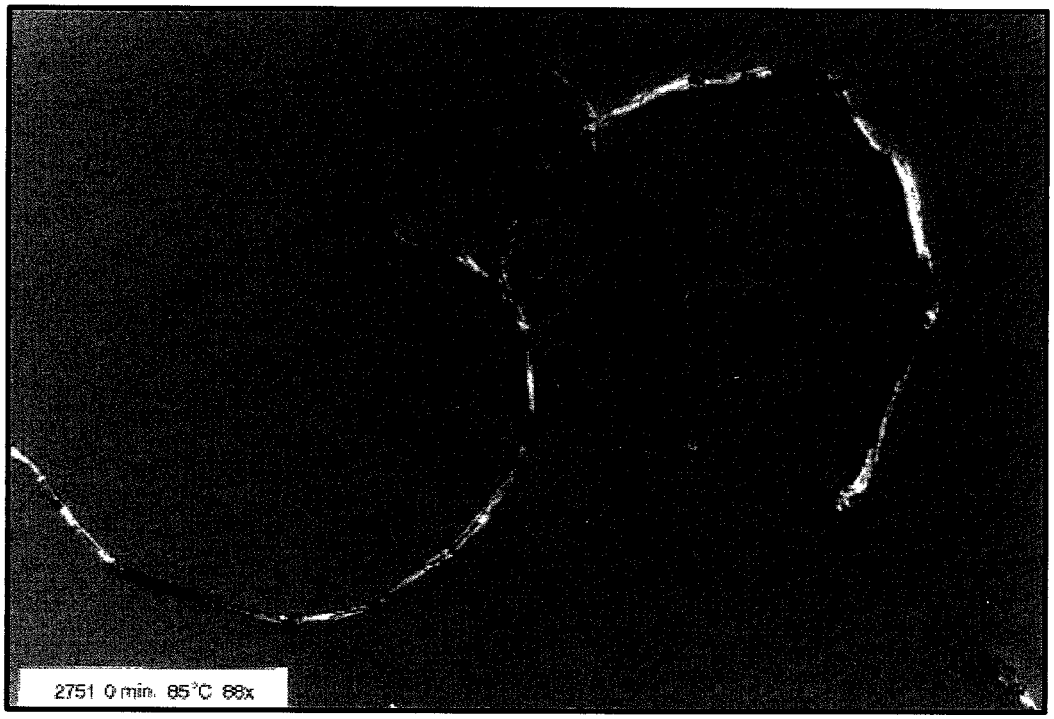
FIG. 5 is a micrograph of a sawdust pulp fiber made by the process according to the present invention.
Figure 6:
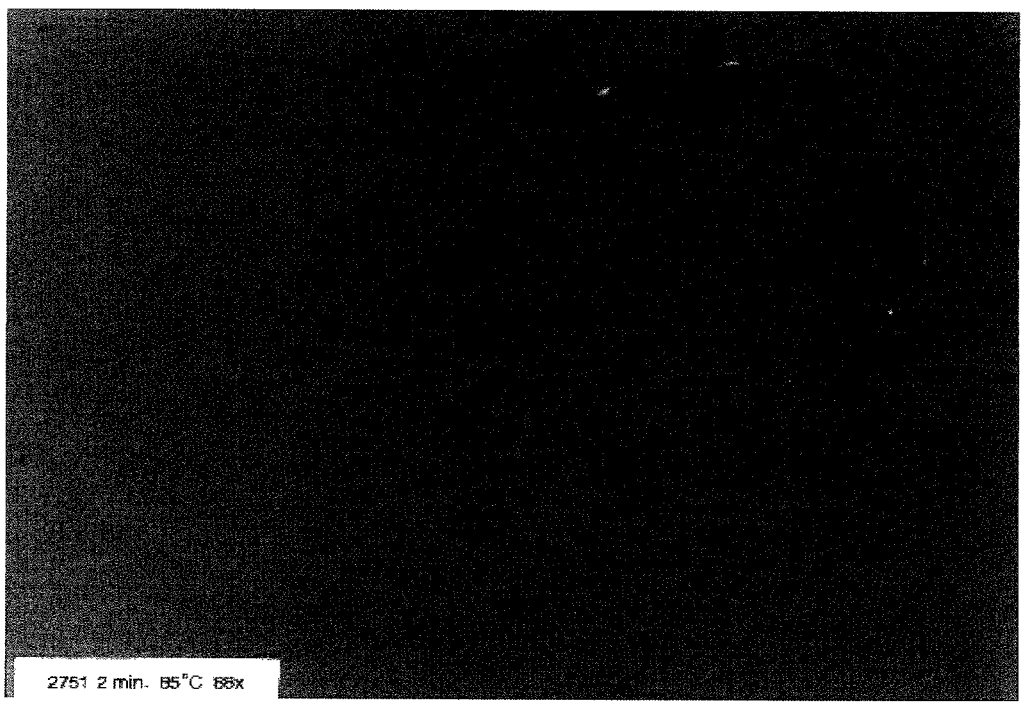
FIG. 6 is a micrograph of the fiber of FIG. 5 after 2 minutes of the same dissolution test used in FIG. 4.

In a first dissolution test with NMMO monohydrate pulp samples produced according to application Ser. No. 09/574,538 and the present invention, respectively, were fluffed and mixed with N-methylmorpholine-N-oxide monohydrate to provide two separate mixtures. Each of the respective mixtures was then heated on a hot plate to 85° C. and the dissolution process of the fibers in the NMMO monohydrate was observed under a light microscope of 88× magnification power. The microscope was equipped with a camera. A photograph of the respective fibers was taken when the mixture reached 85° C. FIG. 3 is a micrograph of the fiber produced according to application Ser. No. 09/574,538 in the solvent. FIG. 5 is a micrograph of the fiber produced according to the present invention in the solvent. Photographs were taken at time intervals of 30 seconds. FIG. 4 shows a micrograph of the prior application '538 fiber after a period of about 2 minutes. FIG. 6 shows a micrograph of the fiber produced according to the present invention after a period of about 2 minutes. As can be seen in FIG. 6, a fiber according to the present invention was substantially dissolved within 2 minutes, but for small vestiges of the fiber visible in the upper right corner of the micrograph. It should be apparent that the fiber is capable of fully dissolving in less than 5 minutes. The pulps produced according to the present invention are faster dissolving, capable of fully dissolving in NMMO monohydrate within about 2 minutes.

EXAMPLE 3

Dry Jet Wet-Spun Fibers

The pulp made according to the present invention was used to prepare a dope sample by dissolving the treated pulp in NMMO. The dope was spun into lyocell fibers by a dry jet wet-process as described in U.S. Pat. No. 5,417,909, which is incorporated herein by reference. The dry jet wet-spinning procedure was conducted by TITK. The properties of the fibers prepared by the dry jet/wet process for the dope sample of the present invention are summarized in Table 1. Table 2 shows a comparative lyocell fiber from a pulp made by the method of application Ser. No. 09/574,538, also using a dry jet wet-process. The differences between the fibers of Tables 1 and 2 reside, at least, with the raw materials used in the process.

A second dissolution test was applied to the pulp samples used to make the lyocell fibers of Tables 1 and 2. The pulps were separately dissolved in NMMO at 80° C. to 100° C. to yield a 0.6% solution of cellulose without minimum stirring. The time for complete dissolution of the pulps was observed by light microscopy at a magnification of 40× to 70×. The times for dissolution of the pulps are set forth in Table 1 and Table 2. The faster dissolution time of the sawdust pulp is apparent. This is thought to be due to the generally shorter fiber lengths of the pulp, yet the resultant lyocell fiber properties made from wood chips and sawdust are comparable.

TABLE 1

| Fiber Properties (Alkaline Sawdust Pulp/Alkaline Treatment) | | |
|---|---|---|
| fiber fineness (dtex) | 1.42 | 1.60 |
| cellulose [pulp] content (%) in dope | 12.3 | 12.3 |
| hemicellulose content (%) in washed fibers | 14.1 | 14.1 |
| tenacity dry (cN/tex) | 35.3 | 36.2 |
| tenacity wet (cN/tex) | 28.7 | 27.9 |
| tenacity ratio (%) | 81.3 | 77.1 |
| elongation dry @ break (%) | 14.0 | 14.6 |
| elongation wet @ break (%) | 13.2 | 14.2 |
| loop tenacity (cN/tex) | 12.4 | 13.8 |
| loop tenacity ratio (%) | 35.1 | 38.1 |
| initial modulus (cN/tex) | 601 | 606 |
| wet modulus (cN/tex) | 185 | 169 |
| fiber DP | 451 | 451 |
| Dissolution time (min)* | 60 | 60 |

TABLE 1-continued

| Fiber Properties (Alkaline Sawdust Pulp/Alkaline Treatment) | | |
|---|---|---|
| Length-Weighted Average Fiber Length (mm) | 1.2 | 1.2 |
| coarseness (mg/100 m) | 15 | 15 |

*Dissolution test of Example 3.

TABLE 2

| (Comparative) Fiber Properties (Kraft Wood Chip Pulp/Alkaline Treatment) | | |
|---|---|---|
| fiber fineness (dtex) | 1.63 | 1.25 |
| cellulose [pulp] content (%) in dope | 11.3 | 11.3 |
| hemicellulose content (%) in washed fibers | 13 | 13 |
| tenacity dry (cN/tex) | 40.9 | 42.0 |
| tenacity wet (cN/tex) | 31.0 | 32.5 |
| tenacity ratio (%) | 75.8 | 77.4 |
| elongation dry @ break (%) | 12.9 | 12.7 |
| elongation wet @ break (%) | 13.2 | 12.7 |
| loop tenacity (cN/tex) | 8.7 | 10.4 |
| loop tenacity ratio (%) | 21.3 | 24.8 |
| initial modulus (cN/tex) | 787 | 766 |
| wet modulus (cN/tex) | 191 | 213 |
| fiber DP | 462 | 462 |
| Dissolution time (min)* | 90 | 90 |
| Length-Weighted Average Fiber Length (mm) | 2.05 | 2.05 |
| coarseness (mg/100 m) | 20.3 | 20.3 |

*Dissolution test of Example 3.

The invention claimed is:

1. A process for making a composition for conversion to lyocell fiber, said process comprising:
    pulping a raw material in a digester to provide an alkaline pulp, wherein the raw material comprises sawdust in an amount greater than 25% up to 100%; and
    contacting the alkaline pulp comprising cellulose and at least about 7% hemicellulose under alkaline conditions with an amount of an oxidant sufficient to reduce the average degree of polymerization of the cellulose to within the range of from about 200 to about 1100, without substantially reducing the hemicellulose content of the pulp or substantially increasing the copper number.

2. The process of claim 1, wherein said oxidant comprises at least one member of the group consisting of a chemical with a peroxide group, hydrogen peroxide, oxygen, chlorine dioxide, ozone and combinations thereof.

3. The process of claim 1, wherein the reduction in the average degree of polymerization of the cellulose occurs in the presence of a ratio of magnesium to transition metals of less than about 50%.

4. The process of claim 1, wherein the hemicellulose content of the pulp is reduced less than about 50%.

5. The process of claim 4, wherein the hemicellulose content of the pulp is reduced less than about 15%.

6. The process of claim 5, wherein the hemicellulose content of the pulp is reduced less than about 5%.

7. The process of claim 1, wherein the copper number increases less than about 50%.

8. The process of claim 7, wherein the copper number increases less than about 25%.

9. The process of claim 1, wherein the contacting step further comprises contacting the pulp with an alkali source selected from the group consisting of sodium hydroxide, oxidized white liquor, and unoxidized white liquor.

10. The process of claim 9, wherein the alkaline pulp and oxidant are contacted at a pH greater than about 8.

11. The process of claim 1, further comprising a step for dissolving the composition in a solvent, after the step of contacting the alkaline pulp with an oxidant, wherein the composition is readily dissolved in NMMO monohydrate within 5 minutes for forming into a spinnable dope.

12. The process of claim 1, wherein the digester is a continuous digester.

13. The process of claim 12, wherein the digester is an M&D or Pandia-type digester.

14. The process of claim 1, wherein the sawdust comprises less than or about 50% of fibers retained on a one-quarter inch screen by TAPPI standard 233.

15. The process of claim 14, wherein the sawdust comprises less than about 30% of fibers retained on a one-quarter inch screen by TAPPI standard 233.

16. The process of cLaim 15, wherein the sawdust comprises less than about 15% of fibers retained on a one-quarter inch screen by TAPPI standard 233.

17. The process of claim 1, wherein said raw material comprises about 50% up to 100% sawdust.

* * * * *

UNITED STATES PATENT AND TRADEMARK OFFICE
CERTIFICATE OF CORRECTION

PATENT NO. : 7,090,744 B2  
APPLICATION NO. : 10/128973  
DATED : August 15, 2006  
INVENTOR(S) : Sealey, II et al.

Page 1 of 1

It is certified that error appears in the above-identified patent and that said Letters Patent is hereby corrected as shown below:

Col. 27, Line 4, should read as follows:

oxidant are contacted at a pH of greater than about 8.0.

Signed and Sealed this

Third Day of July, 2007

JON W. DUDAS  
*Director of the United States Patent and Trademark Office*